United States Patent
Mudra et al.

(10) Patent No.: US 10,502,128 B2
(45) Date of Patent: Dec. 10, 2019

(54) HYDRAULIC MODULE WITH SWITCH VALVE FOR CONTROLLING A HYDRAULIC FLUID FLOW OF A CONNECTING ROD FOR AN INTERNAL COMBUSTION ENGINE WITH VARIABLE COMPRESSION AND CONNECTING ROD

(71) Applicant: ECO Holding 1 GmbH, Marktheidenfeld (DE)

(72) Inventors: Alexander Mudra, Marktheidenfeld (DE); Dietmar Schulze, Muenzenberg (DE); Wolfgang Rupp, Faulbach (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/955,925

(22) Filed: Apr. 18, 2018

(65) Prior Publication Data
US 2018/0320588 A1 Nov. 8, 2018

(30) Foreign Application Priority Data

May 4, 2017 (DE) .......................... 10 2017 109 574
Sep. 13, 2017 (DE) .......................... 10 2017 121 236

(51) Int. Cl.
*F02B 75/04* (2006.01)
*F15B 11/16* (2006.01)
(Continued)

(52) U.S. Cl.
CPC ............ *F02B 75/045* (2013.01); *F15B 11/16* (2013.01); *F15B 13/027* (2013.01); *F15B 15/06* (2013.01);
(Continued)

(58) Field of Classification Search
CPC ...... F02B 75/045; F16C 7/06; F16C 2360/22; F16C 9/04; F02D 15/00
See application file for complete search history.

(56) References Cited

U.S. PATENT DOCUMENTS 8,225,818 B1 7/2012 Stephens et al.
2015/0260094 A1* 9/2015 Wittek ................. F02B 75/045
123/48 B
(Continued)

FOREIGN PATENT DOCUMENTS

DE 102006012733 A1 9/2007
DE 102010019004 A1 11/2011
(Continued)

*Primary Examiner* — Long T Tran
(74) *Attorney, Agent, or Firm* — Von Rohrscheidt Patents

(57) ABSTRACT

A hydraulic module with a switch valve for controlling a flow of a hydraulic fluid in a connecting rod for an internal combustion engine with variable compression with an eccentric element adjustment arrangement for adjusting an effective connecting rod length, wherein the eccentrical element adjustment arrangement includes a first cylinder and a second cylinder configured as hydraulic chambers, wherein a first inlet is provided for feeding the hydraulic fluid into the first cylinder and a second inlet is provided for feeding the hydraulic fluid into the second cylinder, wherein a first outlet is provided for draining the hydraulic fluid from the first cylinder and a second outlet is provided for draining the hydraulic fluid from the second cylinder wherein a first check valve is associated with the first cylinder and a second check valve is associated with the second cylinder.

17 Claims, 14 Drawing Sheets

(51) Int. Cl.
  *F15B 13/02*    (2006.01)
  *F15B 15/06*    (2006.01)
  *F16C 7/06*     (2006.01)
  *F16K 15/14*    (2006.01)
(52) U.S. Cl.
  CPC .............. *F16C 7/06* (2013.01); *F16K 15/145* (2013.01); *F15B 2211/30505* (2013.01); *F15B 2211/30525* (2013.01); *F15B 2211/7107* (2013.01); *F16C 2360/22* (2013.01)

(56) References Cited

U.S. PATENT DOCUMENTS

| | | | | |
|---|---|---|---|---|
| 2016/0169099 | A1* | 6/2016  | Schaffrath | F02B 75/045 |
| | | | | 123/197.3 |
| 2016/0312713 | A1* | 10/2016 | Hutzelmann | F02D 15/02 |
| 2016/0319737 | A1* | 11/2016 | Schaffrath | F02B 75/045 |
| 2017/0082021 | A1* | 3/2017  | Schaffrath | F02B 75/045 |
| 2017/0248074 | A1* | 8/2017  | Ezaki | F02D 15/02 |
| 2018/0051625 | A1* | 2/2018  | Jung | F02B 75/045 |

FOREIGN PATENT DOCUMENTS

| | | |
|---|---|---|
| DE | 102010021399 A1 | 12/2011 |
| DE | 102012014917 A1 | 2/2013 |
| DE | 102012020999 A1 | 1/2014 |
| EP | 2375014 A1 | 10/2011 |
| WO | WO2014019683 A1 | 2/2014 |
| WO | WO2016058600 A1 | 4/2016 |
| WO | WO2016103554 A1 | 6/2016 |

\* cited by examiner

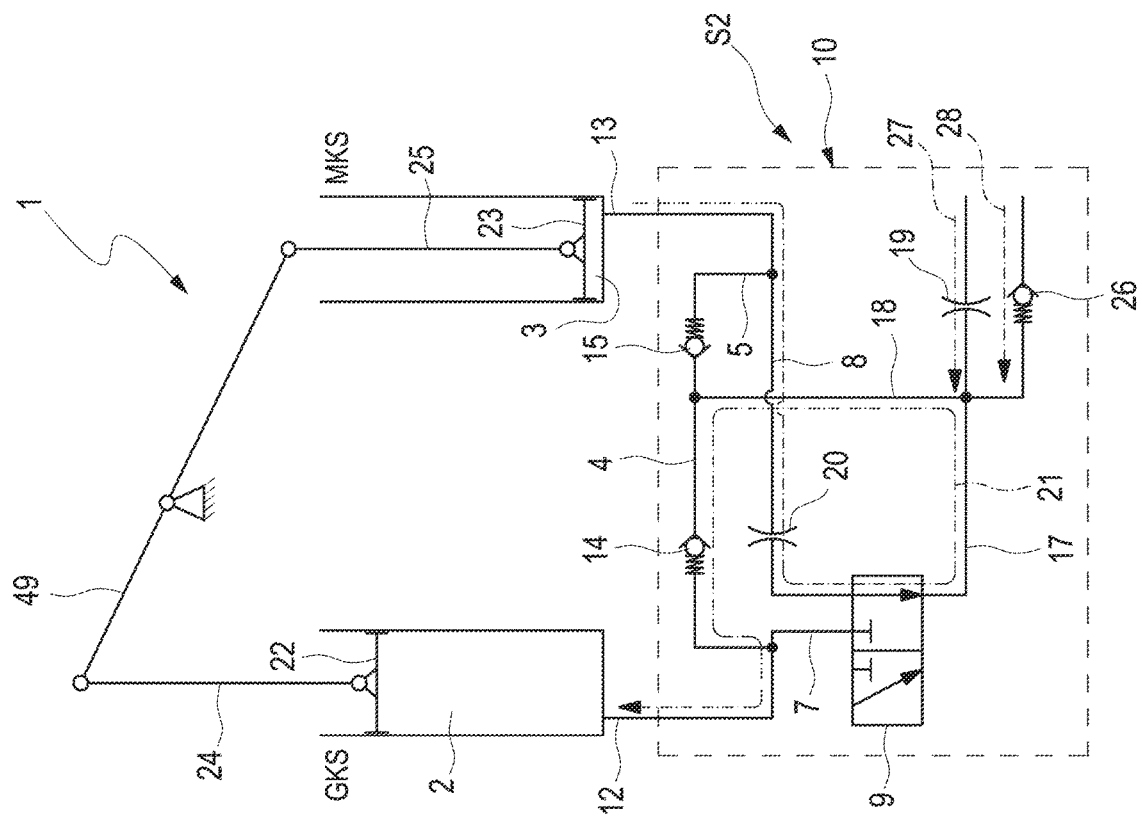
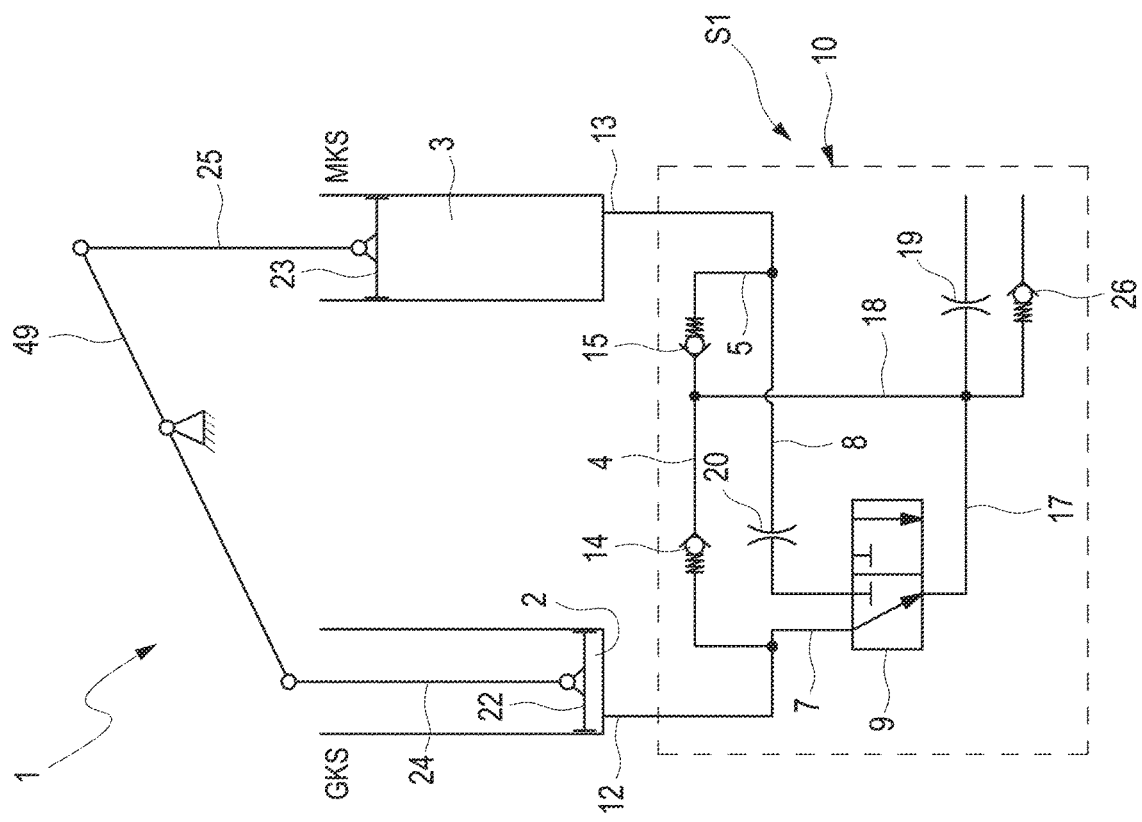
FIG. 2A
FIG. 2B

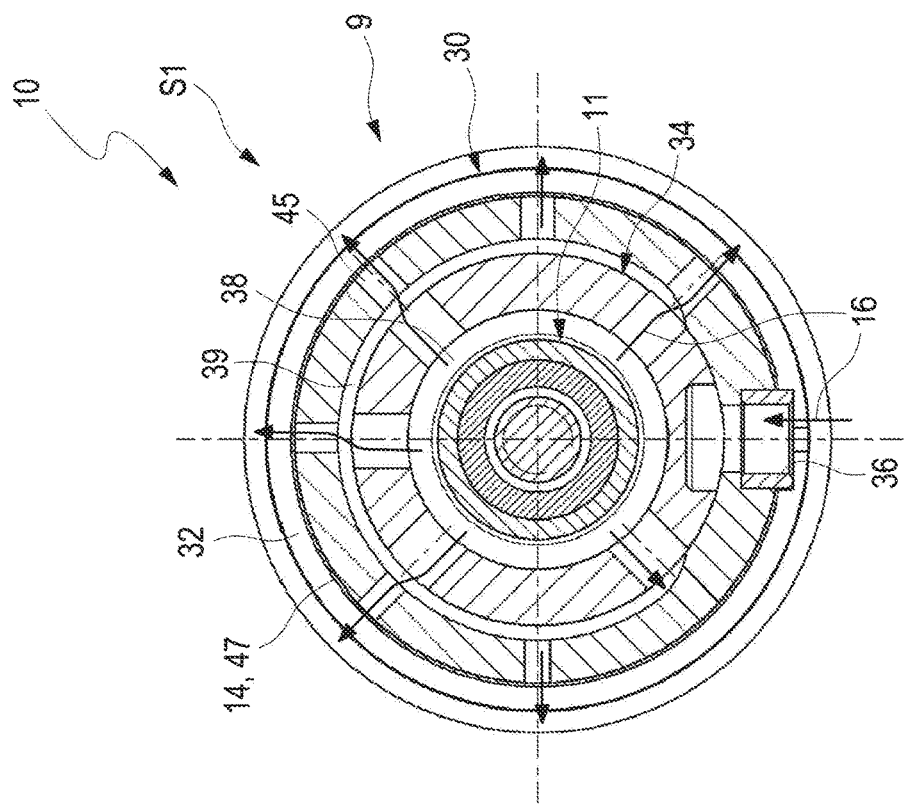
FIG. 8 (B-B)
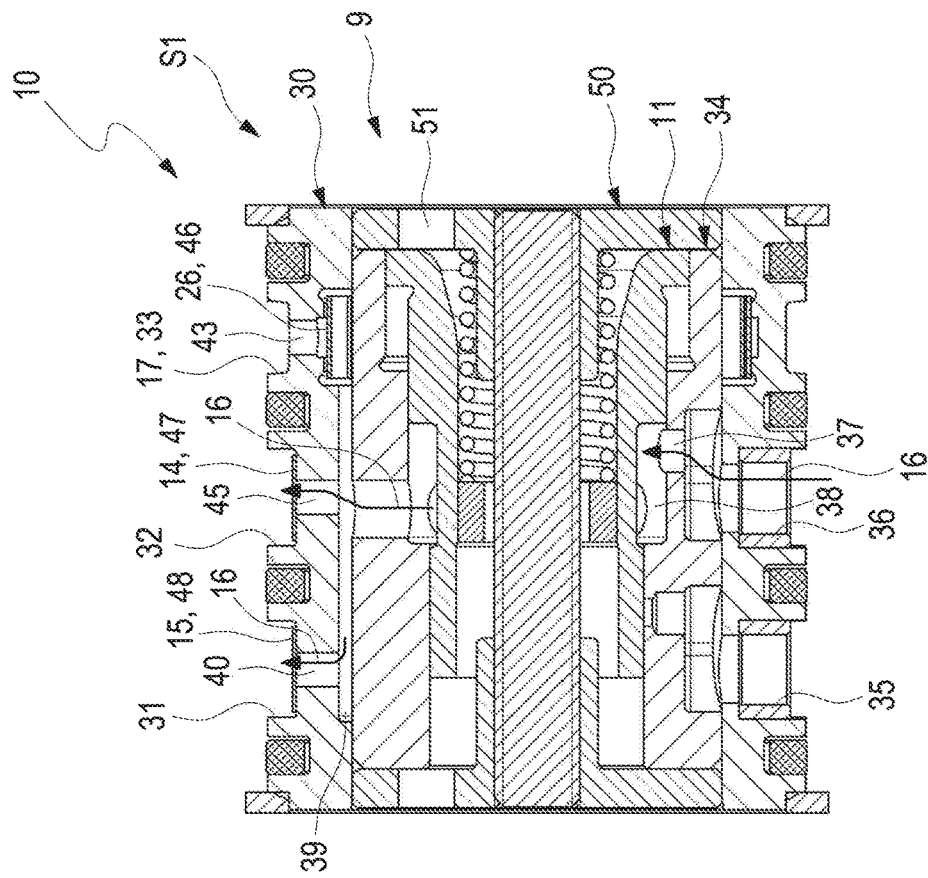
FIG. 7 (A-A)

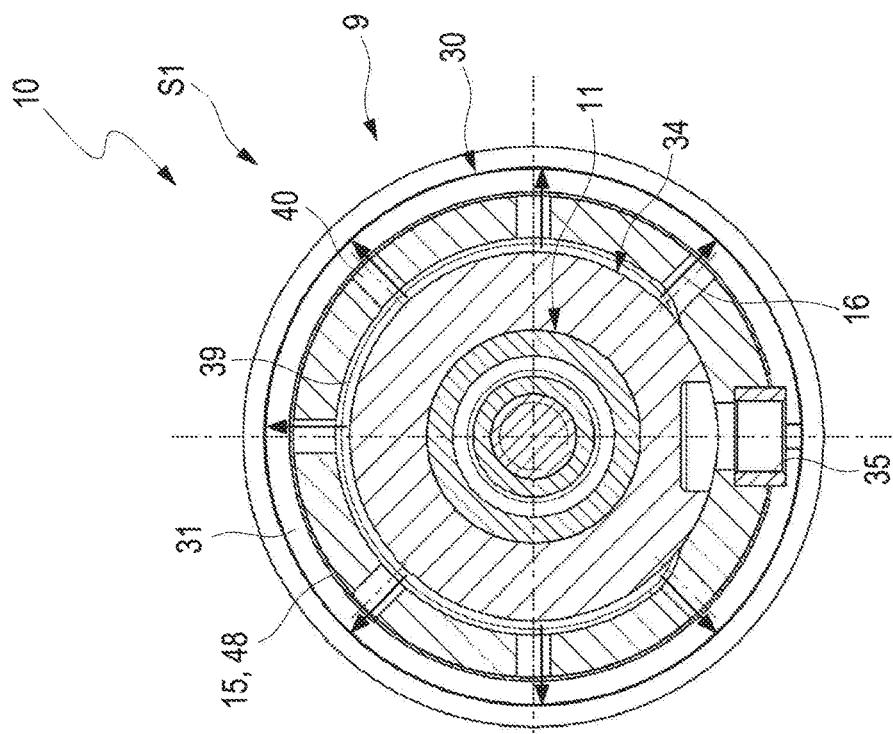
FIG. 10 (D-D)
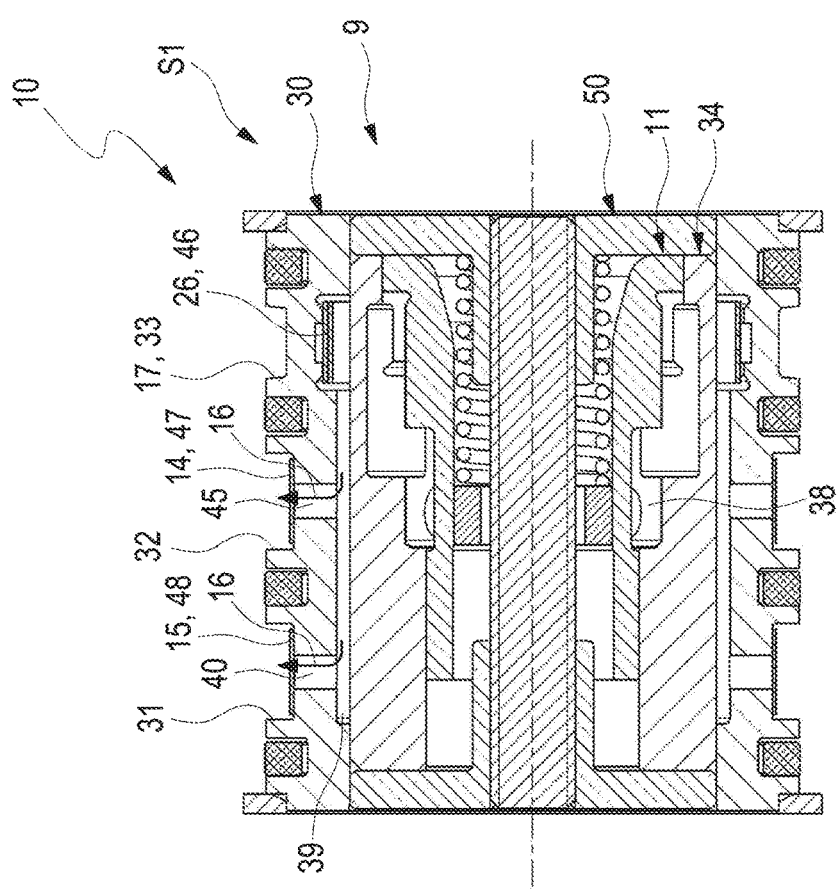
FIG. 9 (C-C)

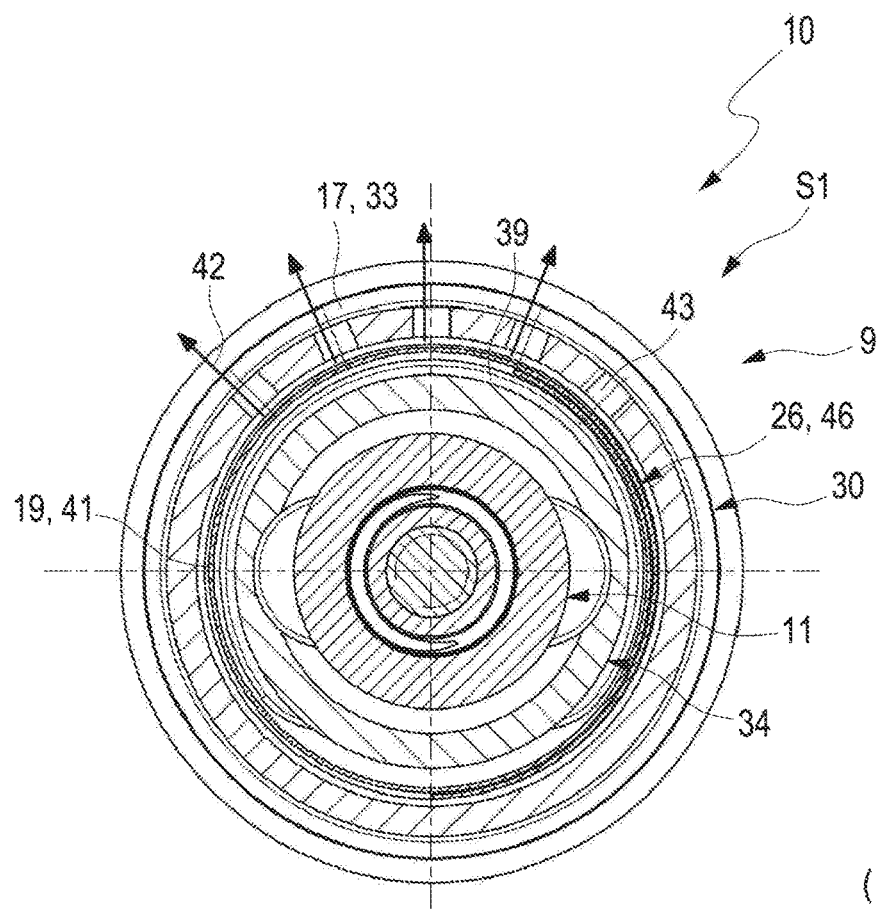
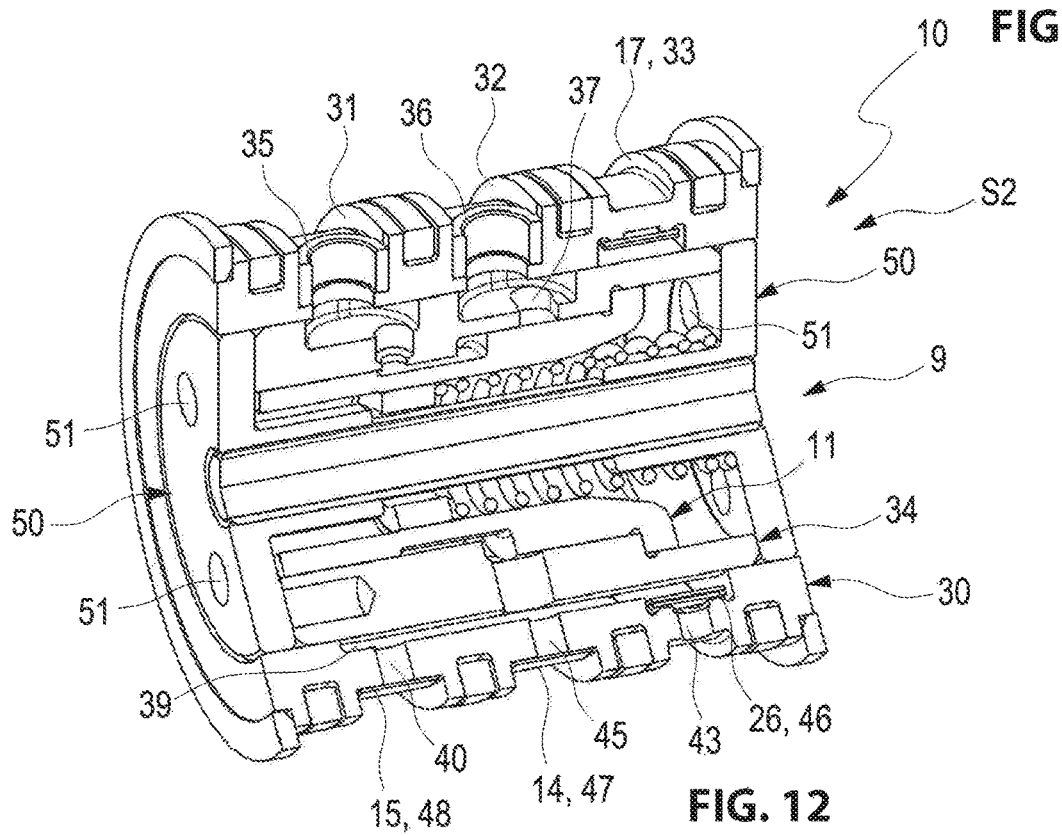

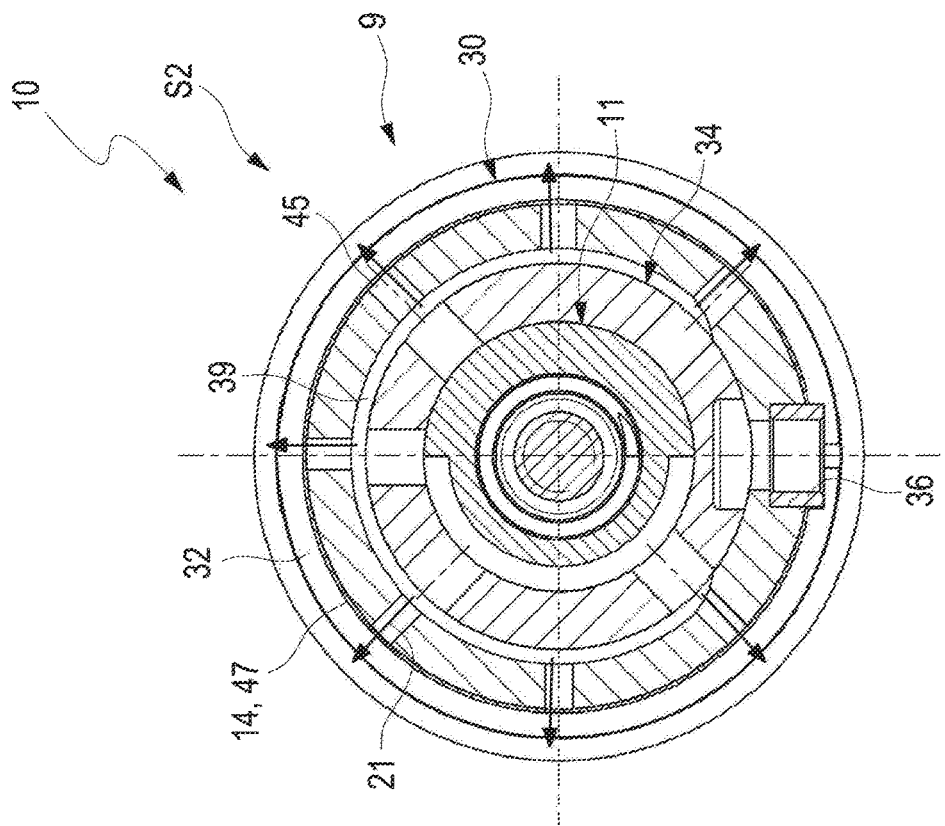
FIG. 14 (B-B)
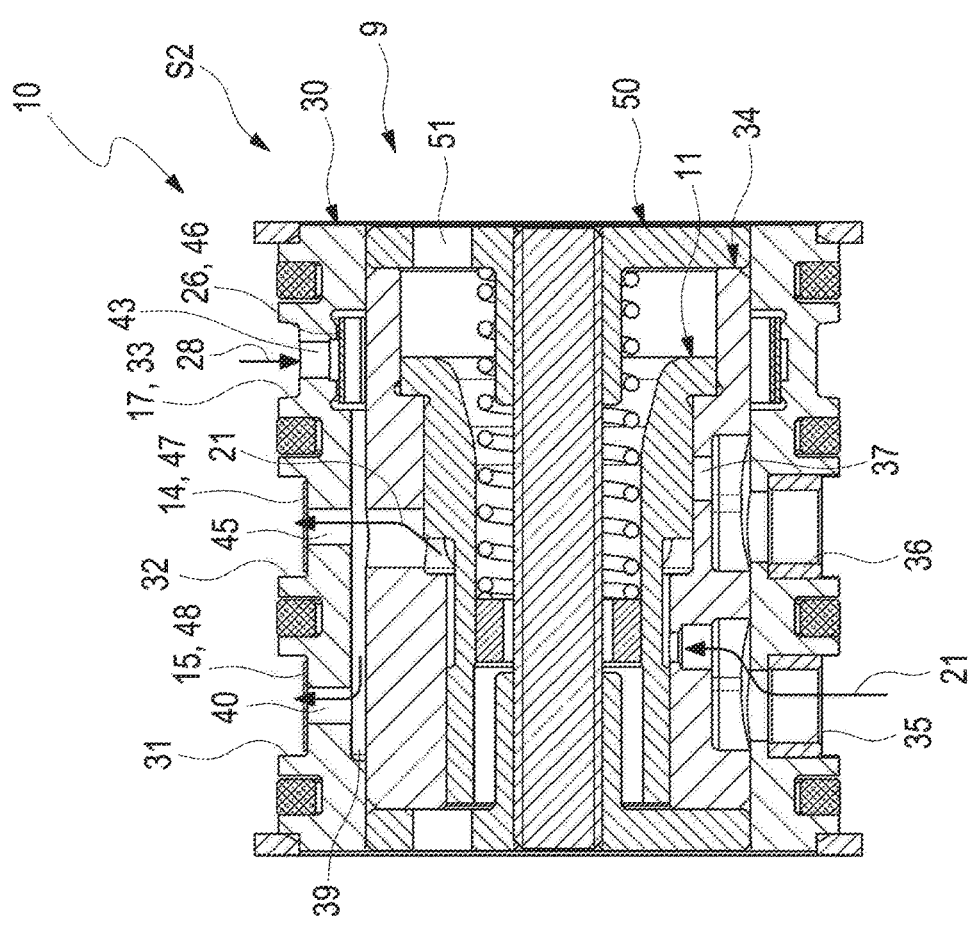
FIG. 13 (A-A)

(D-D)

(C-C)

(E-E)

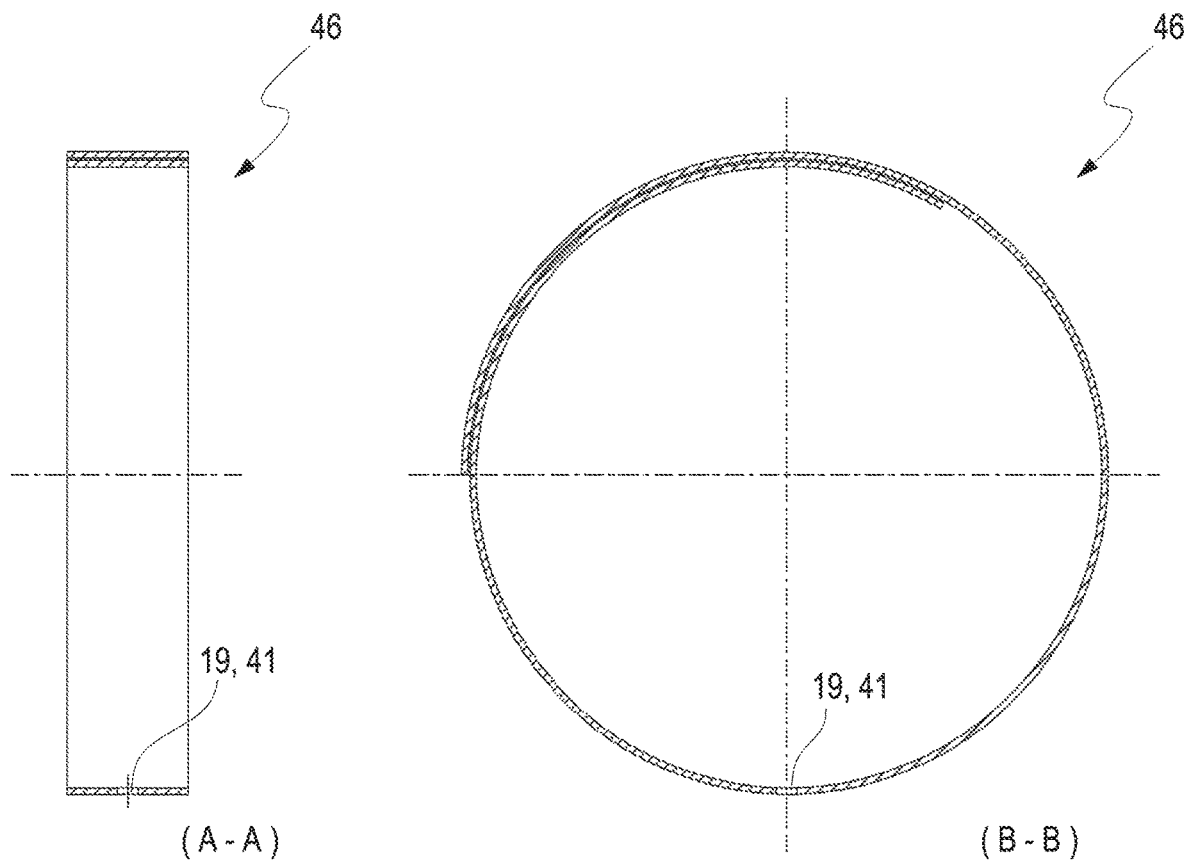
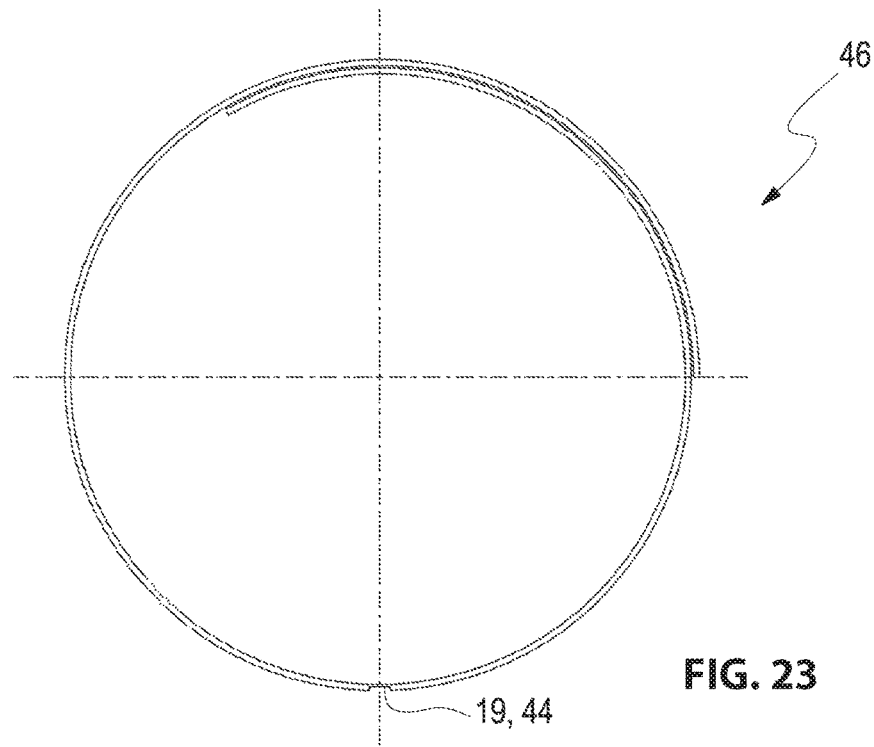

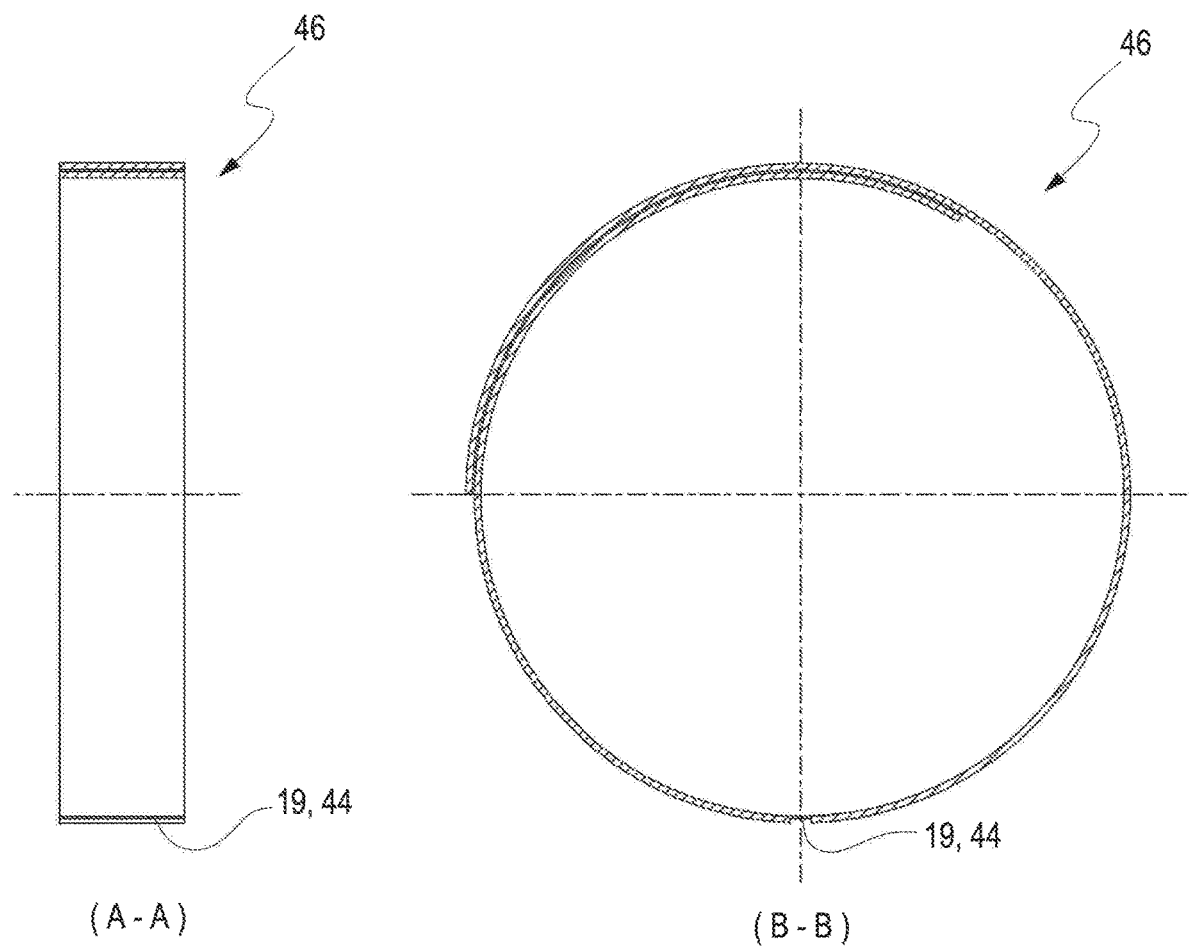

HYDRAULIC MODULE WITH SWITCH VALVE FOR CONTROLLING A HYDRAULIC FLUID FLOW OF A CONNECTING ROD FOR AN INTERNAL COMBUSTION ENGINE WITH VARIABLE COMPRESSION AND CONNECTING ROD

RELATED APPLICATIONS

This application claims priority from German Patent Applications
DE 10 2017 109 574.8 filed on May 4, 2017; and
DE 10 2017 121 236.1 filed Sep. 13, 2017,
both of which are incorporated in their entirety by this reference.

FIELD OF THE INVENTION

The invention relates to a hydraulic module with a switch valve for controlling a hydraulic fluid flow of a connecting rod for an internal combustion engine with variable compression with an eccentric adjustment device for adjusting an effective connecting rod length and to a connecting rod with the hydraulic module.

BACKGROUND OF THE INVENTION

In internal combustion engines high compression ratio has positive effect upon efficiency of the internal combustion engine. Compression ratio is typically a ratio of an entire cylinder cavity before compression to a remaining cylinder cavity after the compression. In internal combustion engines with external ignition in particular gasoline engines which have fixed compression ratio the compression ratio must only be selected at a level so that so called "knocking" under full load of the internal combustion engine is prevented. However, the compression ratio can be selected for higher values for much more prevalent partial load operations of the internal combustion engine, thus for a lower cylinder charge without the knocking occurring. The important partial load operations of the internal combustion engine can be improved when the compression ratio is variably adjustable. In order to adjust the compression ratio systems are known that have a variable connecting rod length.

A hydraulic module for a connecting rod for an internal combustion engine with variable compression with an eccentrical adjustment arrangement for adjusting an effective connecting rod length is known for example from DE 10 2012 020 999 A1.

BRIEF SUMMARY OF THE INVENTION

Thus, it is an object of the invention to provide an improved hydraulic module for a connecting rod for an internal combustion engine with variable compression with an eccentrical element adjustment arrangement for adjusting an effective connecting rod length which provides stable operating properties. By the same token the hydraulic module shall be configured in a simple and cost effective manner.

It is another object of the invention to provide an improved connecting rod with the hydraulic module.

The object is achieved by a hydraulic module with a switch valve for controlling a flow of a hydraulic fluid in a connecting rod for an internal combustion engine with variable compression with an eccentric element adjustment arrangement for adjusting an effective connecting rod length, wherein the eccentrical element adjustment arrangement includes a first cylinder and a second cylinder configured as hydraulic chambers, wherein a first inlet is provided for feeding the hydraulic fluid into the first cylinder and a second inlet is provided for feeding the hydraulic fluid into the second cylinder, wherein a first outlet is provided for draining the hydraulic fluid from the first cylinder and a second outlet is provided for draining the hydraulic fluid from the second cylinder, wherein a first check valve is associated with the first cylinder and a second check valve is associated with the second cylinder, wherein the first check valve is arranged in the first inlet and facilitates feeding the hydraulic fluid into the first cylinder and prevents draining the hydraulic fluid from the first cylinder, wherein the second check valve is arranged in the second inlet and facilitates feeding the hydraulic fluid into the second cylinder and prevents draining the hydraulic fluid from the second cylinder, wherein the switch valve includes a piston which is displaceable into a first switching position or a second switching position, and wherein the first cylinder and the second cylinder are connected so that hydraulic fluid is conductible in the first switching position from the first cylinder into the second cylinder.

Advantageously embodiment and advantages of the invention can derived from the dependent claims, the description and the drawing figures.

According to an aspect of the invention a hydraulic module with a switch valve for controlling a hydraulic fluid flow of a connecting rod for an internal combustion engine with variable compression with an eccentric element adjustment arrangement for adjusting an effective connecting rod length is proposed, wherein the eccentrical adjustment arrangement includes at least a first cylinder and a second cylinder configured as hydraulic chambers wherein a respective inlet is provided for feeding the hydraulic fluid into the cylinders and a respective outlet is provided for draining the hydraulic fluid from the respective cylinders. Advantageously the inlet and the outlet of a cylinder are implemented as a conduit in the switch valve. The cylinders are respectively associated with a check valve which is arranged in the inlet and facilitates feeding hydraulic fluid into the cylinders and prevents draining hydraulic fluid from the cylinders. The check valves are thus advantageously integrated into the switch valve. The switch valve includes a movable piston which is optionally displaceable into a first switching position or a second switching position wherein the cylinders are connected so that hydraulic fluid is conductible in the first switching position from the first cylinder into the second cylinder.

At a first operating connection of the switch valve according to the invention the first cylinder can be connected as a hydraulic chamber of the adjustable connecting rod, for example the cylinder on the gas force side (GKS) of the connecting rod and the second cylinder can be connected at the second operating connection as a hydraulic chamber, for example the cylinder on the mass force side (MKS) of the connecting rod. The corresponding chambers are typically designated as GKS-Chamber or MKS-chamber.

A speed driven acceleration of the relatively long hydraulic fluid columns of the motor oil used in the connecting rod as hydraulic fluid can generate pressure differences. The pressure differences can have a positive effect as well as a negative effect, this means the hydraulic fluid columns can be accelerated so that emptying and filing of the hydraulic chambers of the cylinders of the connecting rod is supported or so that the emptying and filling is impeded. The effect can have a negative impact in particular for a cylinder on the mass force side (MKS) of the connecting rod. The acceleration of the hydraulic fluid columns can have the effect that no positive pressure difference is formed any more in front and behind the MKS-side check valve wherein the positive pressure difference facilitates hydraulic fluid to be fed into the MKS-chamber. Since the chambers always loose hydraulic fluid through leakage and other effects this causes an incremental slow adjustment of the eccentrical element over plural revolutions and thus of the effective connecting rod length from a position with low compression ($\varepsilon_{low}$) which corresponds to the first switching position of the switch valve into a position with high compression ($\varepsilon_{high}$) which corresponds to the second switching position of the switch valve. This is called drifting. The drifting occurs in particular for engine load situations with high mass forces (tension force and connecting force at the connecting rod) and low gas forces (compression force at the connecting rod). An adjustment of the connecting rod in a direction with high compression $\varepsilon_{high}$ through the mass forces in tension direction cannot be reset completely by the mass forces in the compression direction and by the gas forces.

This effect can be advantageously avoided by the hydraulic module according to the invention in that the GKS-chamber can conduct the hydraulic fluid that was fed in a position of low compression ($\varepsilon_{low}$) wherein the conducting is performed directly and without throttling into the MKS chamber. This can be done because the hydraulic fluid that the GKS chamber presses into the MKS-chamber through the gas and mass forces in compression direction has a much higher pressure than a hydraulic fluid pressure of the hydraulic supply in the bearing shell of the connecting rod. Thus, the hydraulic fluid can be pressed from the GKS-chamber into the MKS-chamber.

In addition to the positional stability of the eccentrical element adjustment arrangement of the connecting rod in the position $\varepsilon_{low}$, this means that the connecting rod is in an end position $\varepsilon_{low}$ again after a revolution also the position stability along the revolution or the stiffness of the connecting rod can be increased. During a revolution there is always a movement of the eccentrical element lever since the hydraulic fluid columns also have a certain amount of flexibility so that a certain sinking of the support piston in the filled chamber occurs all the time. When the piston resets completely towards the end of the revolution this is called "position stable". However, a respective support piston can impact a base of the chamber during an angle change at the eccentrical element or of the lever assembly during resetting which can have a negative effect on service life. Therefore an adjustment speed of the eccentrical element adjustment arrangement can be limited by throttling locations in the hydraulic conduits. A pressure loaded preloaded MKS-hydraulic fluid column advantageously sinks less than a non-preloaded hydraulic fluid column. Less sinking means less lever movement which can help to improve position stability in the position $\varepsilon_{low}$.

According to an advantageous embodiment hydraulic fluid can be conductible in the second switching position from the second cylinder into the first cylinder. This facilitates a quick shifting of the connecting rod from the second switching position with high compression $\varepsilon_{high}$ into the first switching position with low compression $\varepsilon_{low}$. Furthermore a consumption of hydraulic fluid is advantageously reduced.

According to an advantageous embodiment the outlet of the second cylinder can include at least an aperture configured as a throttle. Through a throttle a sufficient hydraulic preload of the MKS-hydraulic chamber can be advantageously adjusted since a drain of the second cylinder into the bearing shell is thus impeded.

According to advantageous embodiment a supply conduit of the switch valve can include an aperture as a throttle through which hydraulic fluid can drain in a controlled manner and can be suction fed in the first switching position. This facilitates that the switching process from low compression $\varepsilon_{low}$ to high compression $\varepsilon_{high}$ can be performed sufficiently slowly to prevent damages to the connecting rod and thus facilitate sufficient stability of the shifting process.

According to another advantageous embodiment a check valve can be provided in the supply conduit parallel to the aperture wherein the check valve facilitates feeding hydraulic fluid into the switch valve and prevents a draining of the hydraulic fluid. This facilitates that required hydraulic fluid can be fed easily in an un-throttled manner but that a draining of the hydraulic fluid can only be performed through the aperture that is connected in parallel as a throttle so that the flow is correspondingly slow. This way a respective preload of the MKS chamber can be advantageously achieved.

According to another advantageous embodiment the check valve can be configured as a closure element and include an essentially annular band element which is at least partially supported at a housing of the switch valve and which closes at least one opening of the housing in a closed position. A so called band check valve represents a particular advantageous and economical variant of a check valve which can be produced in a particular simple and cost effective manner and which can be integrated in the hydraulic module in a very compact manner.

According to an advantageous embodiment the check valve can be arranged in an interior the housing of the switch valve and can open in a radially inward direction. Particularly advantageously the band check valve can be integrated in an interior of the switch valve. By using the band element as a closure element the check valve can be advantageously mounted in an interior of the housing of the switch valve.

According to another advantageous embodiment the aperture and the check valve can be provided as a combined element. The combination of the elements facilitates a particularly compact configuration of the hydraulic module.

According to an advantageous embodiment the band element can include a radial bore hole configured as an aperture configured at a circumference of the band element. A bore hole of this type can be configured as an aperture and can be configured in a simple and cost effective manner to implement a reliable function of the throttle effect of the aperture.

According to an advantageous embodiment the band element can include a notch arranged on the circumference of the band element to form an aperture. The alternative of the notch configured as an aperture can also be implemented in a simple and cost effective manner. Furthermore a reliable function of the throttle effect of the aperture is thus implementable.

According to an advantageous embodiment the housing can include a notch that is oriented towards a circumference of the band element and that forms an aperture. Alternatively it is also possible to configure the aperture as a throttle in the housing in that a notch that is arranged parallel to the band element is introduced into an interior of the housing. Also this notch can be provided in a simple and cost effective manner.

According to an advantageous embodiment the check valve can be configured as a ball check valve and can be arranged in the housing of the switch valve and the housing can include a notch that extends parallel to a hydraulic fluids path of the check valve and forms an aperture. Using a ball as a closure element of the check valve is an alternative solution to integrate a cost effective check valve in a hydraulic module. A recess that extends parallel to the hydraulic fluid path of the check valve, e.g. configured as a notch can thus form a simple alternative solution for the aperture as a throttle for the hydraulic fluid path.

According to an advantageous embodiment at least one of the check valves and/or the aperture can be integrated into the switch valve. A particularly compact arrangement of the check valves and/or the aperture represents a simple and cost effective solution for implementing a hydraulic module to be used in a connecting rod for an internal combustion engine with variable compression. Thus, economical production can be combined with robust and reliable function of the hydraulic module.

According to an advantageous embodiment at least one of the check valves configured as a closure element can include an essentially annular band element with a circumference which at least partially envelops a circumference of the housing of the switch valve at least partially and which is partially supported at the housing and which closes at least one opening of the housing in a closed position. A check valve of this type can be advantageously provided at an outside of the switch valve and can thus form a particular compact arrangement of the check valve. Also this way robust operating properties of the check valve can be expected over its service life.

According to another advantageous embodiment the at least one check valve can open in a radially outward direction. The arrangement of the band check valve, is particularly advantageous when the band check valve shall open from the inside in outward direction. Thus, a particularly compact arrangement of the check valve at the hydraulic module can be achieved since the band element only has a small thickness.

According to another advantageous embodiment the switch valve can be configured as a 3/2-way valve. For the proposed connection of a hydraulic diagram of a connecting rod for an internal combustion engine with variable compression a switch valve with three inlets and two outlets is particularly advantageous and represents a particularly cost effective solution for a hydraulic module. Advantageously the inlets and outlets are combined so that only three connections are provided all three connections are respectively used as an inlet and also as an outlet.

According to another aspect of the invention a connecting rod is proposed for an internal combustion engine with variable compression with an eccentric element adjustment arrangement for adjusting an effective connecting rod length with a hydraulic module.

The connecting rod according to the invention advantageously only requires three hydraulic fluid conduits in the connecting rod base element which facilitates economical fabrication. Furthermore only a 3/2-way valve is required as a switch valve in the hydraulic module which advantageous simplifies the engineering design of the connecting rod. The MKS-hydraulic chamber can be preloaded by the GKS-hydraulic chamber in the first switching position with low compression $\varepsilon_{low}$. Advantageously thus only different volumes of hydraulic fluid are exchanged between the GKS- and MKS-hydraulic chamber with the bearing shell of the connecting rod, this means no additional hydraulic fluid flows through the hydraulic fluid conduits in the bearing shells. Check valves and throttles can be advantageously integrated into the engineering design of the hydraulic module. Thus, a hydraulic flow path for both variants without or with additional check valve can be arranged in a hydraulic module.

BRIEF DESCRIPTION OF THE DRAWINGS

Further advantages can derived from the subsequent drawing description. In the drawing embodiments of the invention are schematically illustrated. The drawing, the description and the claims include numerous features in combination. A person skilled in the art will advantageously view the features also individually and will combine them into additional useful combinations, wherein:

FIG. 2A illustrates a second embodiment of a hydraulic diagram of a connecting rod in first switching position $\varepsilon_{low}$;

FIG. 2B illustrates the second embodiment of the hydraulic diagram in a second switching position $\varepsilon_{high}$;

FIG. 7 illustrates a cut view A-A of the hydraulic module according to FIG. 3 in the first switching position $\varepsilon_{low}$;

FIG. 8 illustrates a sectional view B-B of the hydraulic module according to FIG. 3 in the first switching position $\varepsilon_{low}$;

FIG. 9 illustrates sectional view C-C of the hydraulic module according to FIG. 3 in the first switching position $\varepsilon_{low}$;

FIG. 10 illustrates a sectional view D-D of the hydraulic module according to FIG. 3 in the first switching position $\varepsilon_{low}$;

FIG. 11 illustrates a sectional view E-E of the hydraulic module according to FIG. 3 in the first switching position $\varepsilon_{low}$;

FIG. 12 illustrates a perspective partial sectional view of the hydraulic module according to FIG. 3 in the second switching position $\varepsilon_{high}$;

FIG. 13 illustrates a sectional view A-A of the hydraulic module according to FIG. 3 in the second switching position $\varepsilon_{high}$;

FIG. 14 illustrates a sectional view B-B of the hydraulic module according to FIG. 3 in the second switching position $\varepsilon_{high}$;

FIG. 21 illustrates a sectional view of A-A of the band element of the check valve according to FIG. 18;

FIG. 22 illustrates sectional view B-B of the band element of the check valve according to FIG. 18;

FIG. 23 illustrates a first view of an additional embodiment of a band element of a check valve for a hydraulic module according to the invention;

FIG. 26 illustrates sectional view A-A of the band element of the check valve according to FIG. 23; and FIG. 27 illustrates a sectional view B-B of the band element of the check valve according to FIG. 23.

DETAILED DESCRIPTION OF THE INVENTION

Figure 1A:
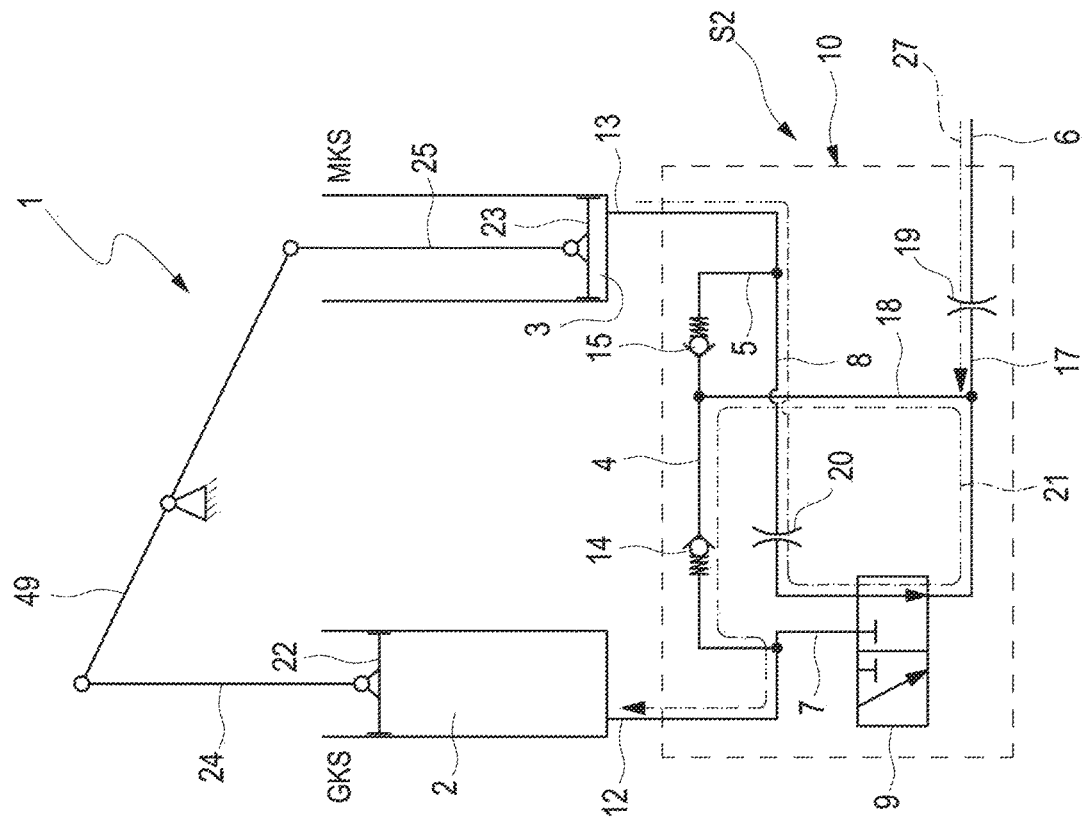
FIG. 1A illustrates a first embodiment of a hydraulic diagram of a connecting rod in a first switching position $\varepsilon_{low}$.

In the drawings figures like or similar components are designated with identical reference numerals. The drawing figures show exemplary embodiments and do not limit the spirit and scope of the invention.

Figure 1B:
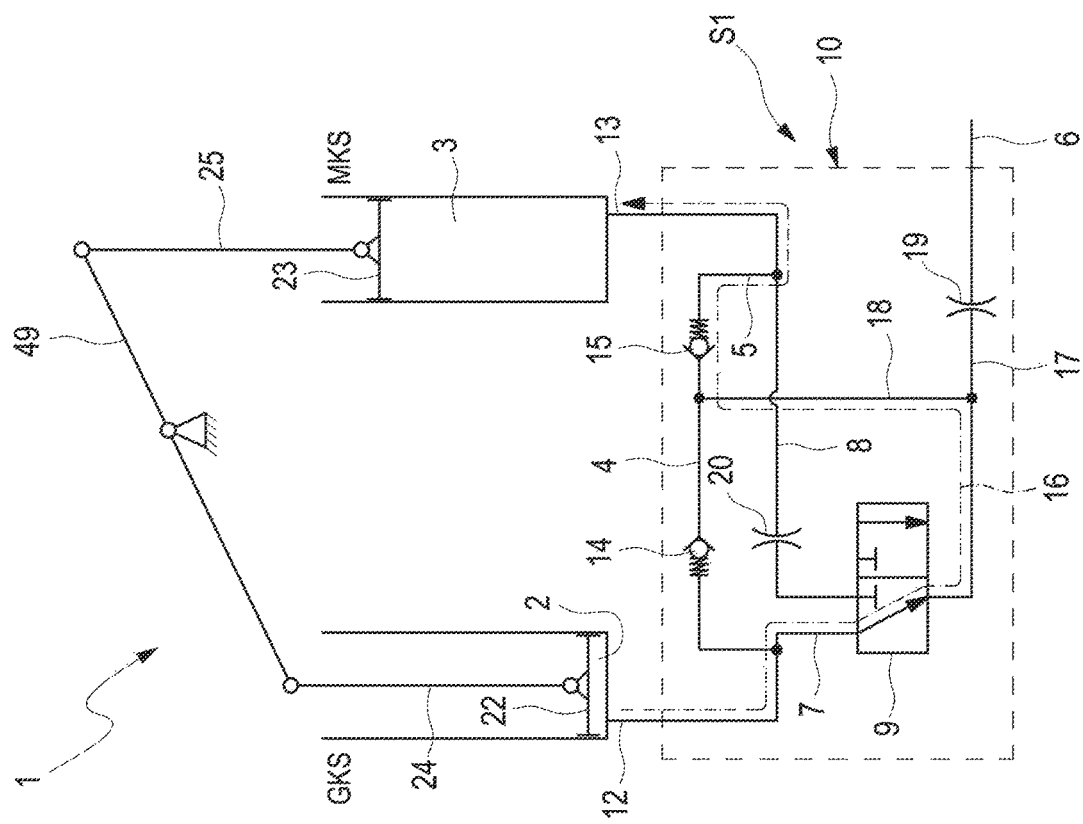
FIG. 1B illustrates the first embodiment of the hydraulic diagram in a second switching position $\varepsilon_{high}$.
Figure 3:
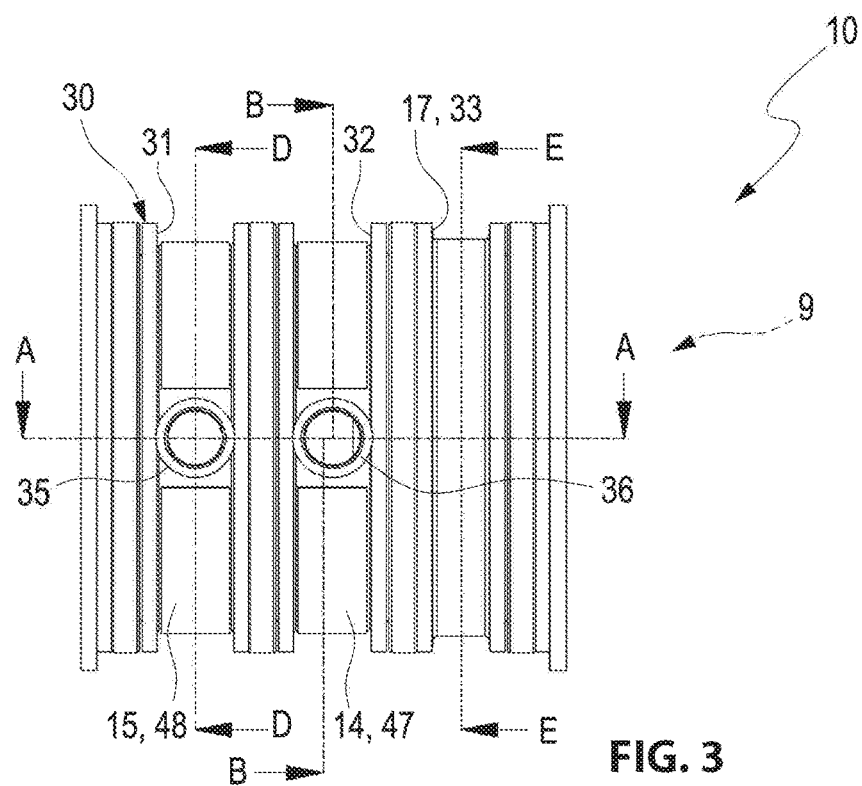
FIG. 3 illustrates a first embodiment of a hydraulic module.
Figure 4:
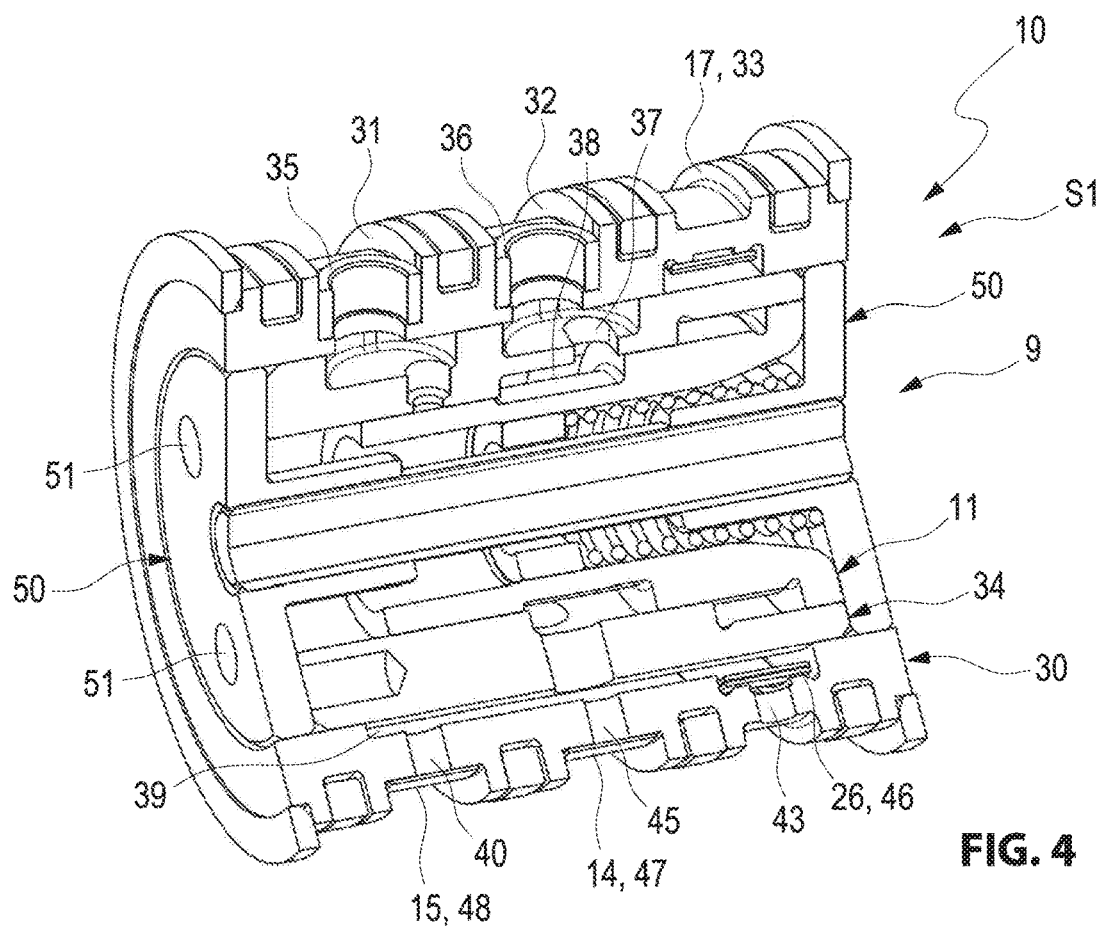
FIG. 4 illustrates a perspective partial view of the hydraulic module according to FIG. 3 in the first switching position $\varepsilon_{low}$.
Figure 5:
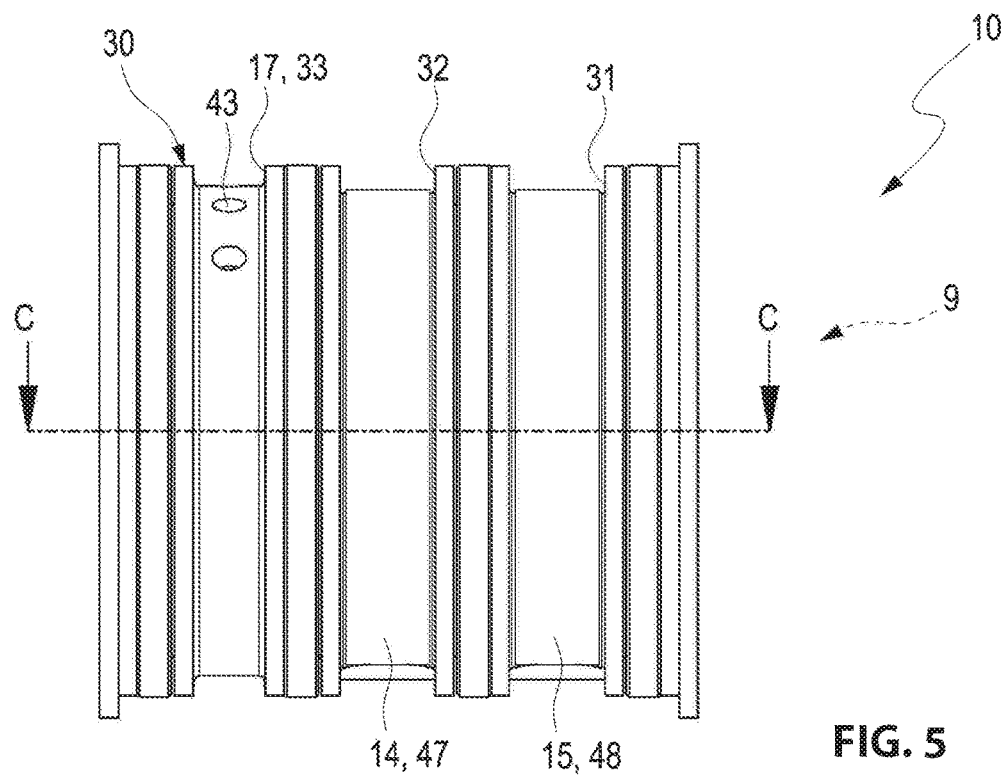
FIG. 5 illustrates a second view of the hydraulic module according to FIG. 3.
Figure 6:
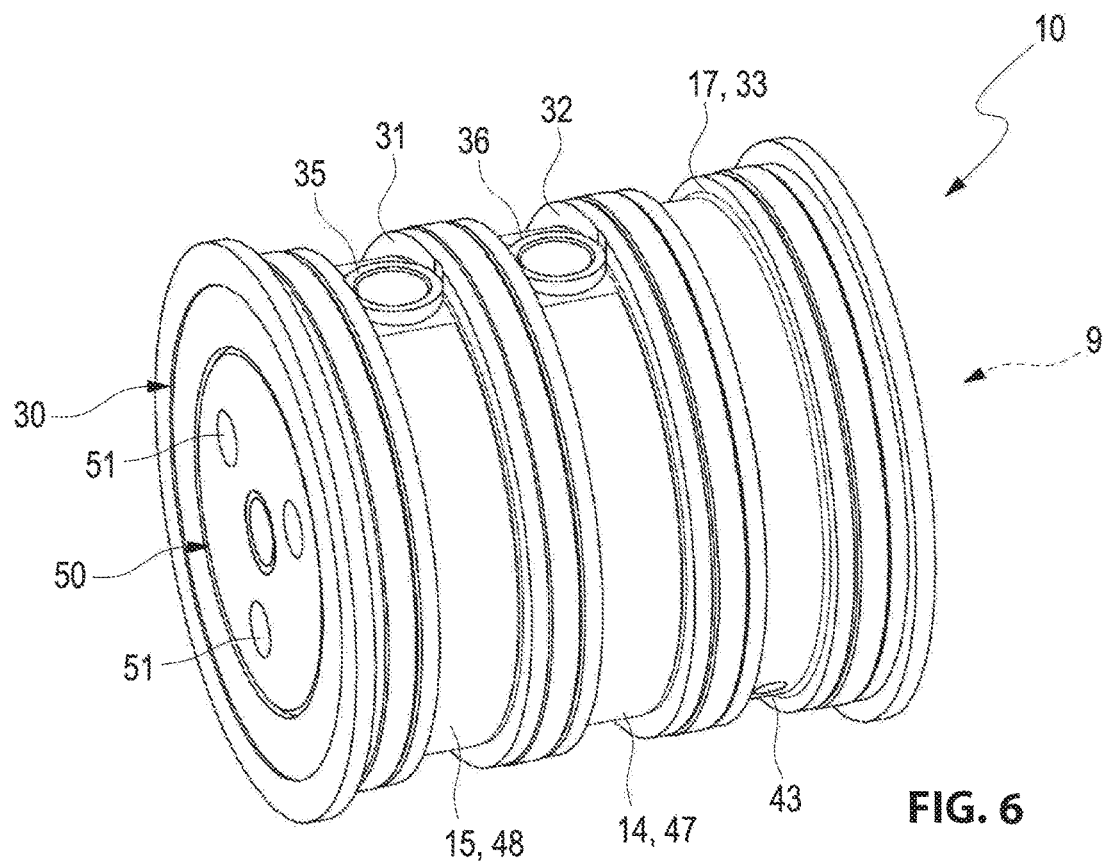
FIG. 6 illustrates perspective view of the hydraulic module according to FIG. 3.
Figure 16:
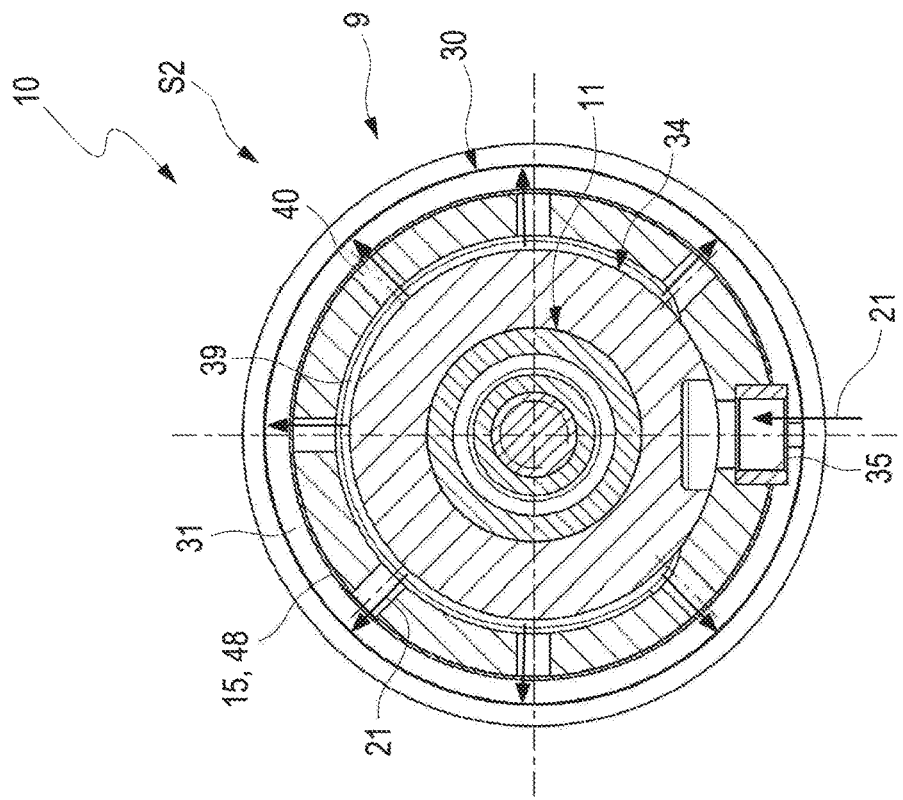
FIG. 16 illustrates sectional view D-D of the hydraulic module according to FIG. 3 in the second switching position $\varepsilon_{high}$.
Figure 15:
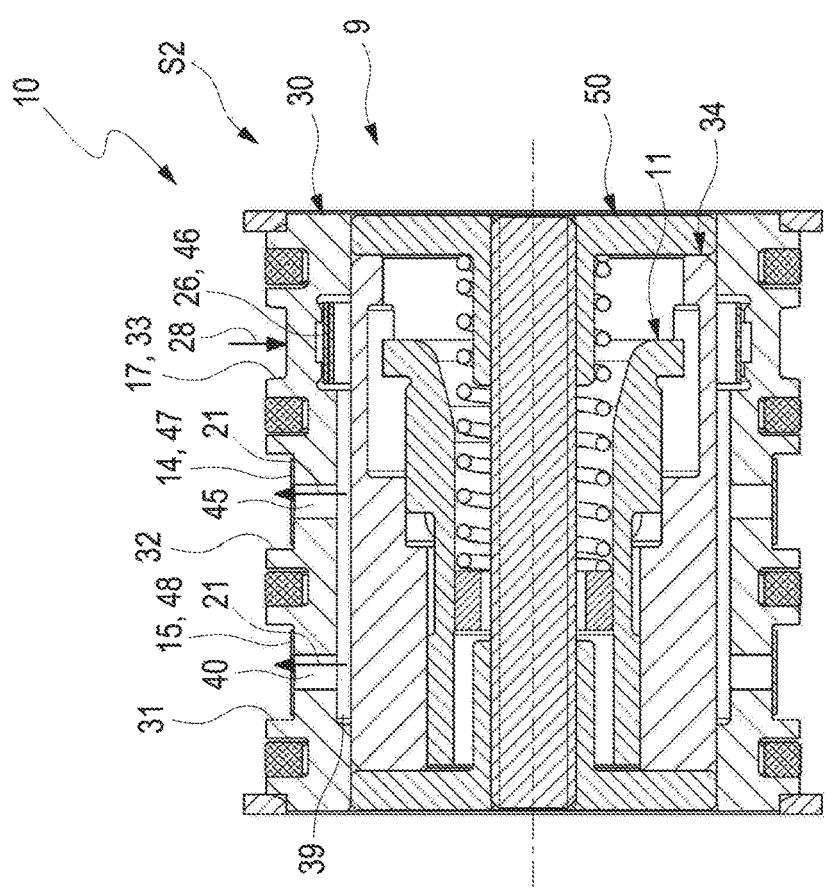
FIG. 15 illustrates a sectional view C-C of the hydraulic module according to FIG. 3 in the second switching position $\varepsilon_{high}$.
Figure 17:
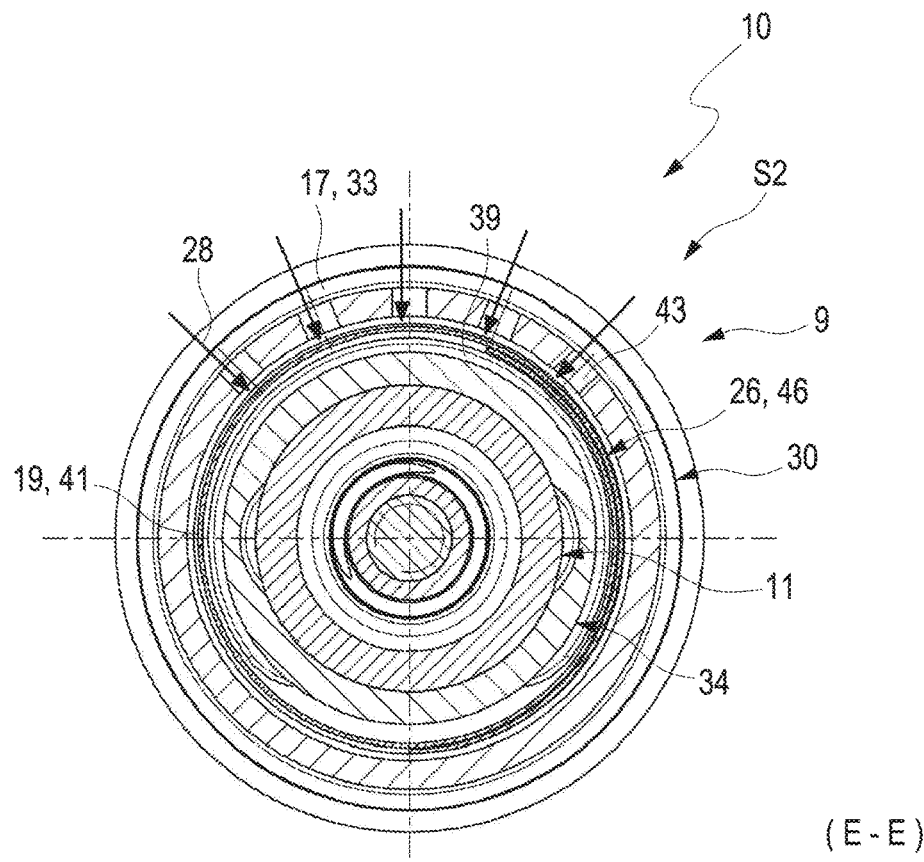
FIG. 17 illustrates a sectional view E-E of the hydraulic module according to FIG. 3 in the second switching position $\varepsilon_{high}$.

FIGS. 1A and 1B illustrate a first embodiment of a hydraulic diagram of a connecting rod 1 with a hydraulic module 10 according to the invention in a first switching position $\varepsilon_{low}$ (S1) (FIG. 1A) and in the second switching position $\varepsilon_{high}$ (S2) (FIG. 1B). The connecting rod 1 in which the hydraulic module 10 according to the invention is advantageously used is only illustrated schematically in the drawing figures. The basic configuration and function of the connecting rod, however, are known from DE 10 2013 107 127 A1 which is incorporated in its entirety by this reference.

The dashed hydraulic module 10 includes a switch valve 9 for controlling a hydraulic fluid flow of the connecting rod 1 for an internal combustion engine with variable compression with an eccentrical element adjustment arrangement for adjusting an effective connecting rod length. The eccentrical element adjustment arrangement includes a first cylinder 2 and second cylinder 3 configured as hydraulic chambers, wherein the an inlet 4, 5 for feeding hydraulic fluid into the cylinders 2, 3 as well as an outlet 7, 8 for draining hydraulic fluid from the cylinders 2, 3 is provided. The inlets 4, 5 and the switch valve 9 are connected with a supply conduit 6 of the connecting rod 1. The inlets 4, 5 and the outlets 7, 8 respectively lead into the cylinders 2, 3 as a common conduit 12, 13.

The switch valve 9, which is subsequently described in more detail and illustrated in the subsequent figures in more detail includes a movable piston 11 which is optionally displaceable into the first switching position S1 or the second switching position S2 wherein the cylinders 2, 3 are connected so that hydraulic fluid is conductible in the first switching position S1 from the first cylinder 2 into the second cylinder 3 and in the second switching position S2 hydraulic fluid is conductible from the second cylinder 3 into the first cylinder 2.

Thus, the first cylinder 2 represents a hydraulic chamber on the gas force side (GKS) of the connecting rod 1, whereas the second cylinder 3 represents a hydraulic chamber on the mass force side (MKS) of the connecting rod 2.

A check valve 14, 15 respectively arranged in the inlets 4, 5 is associated with the cylinders 2, 3, wherein the check valve facilitates feeding hydraulic fluid into the cylinders 2, 3 and prevents draining hydraulic fluid from the cylinders 2, 3.

During the switching process from $\varepsilon_{high}$ to $\varepsilon_{low}$ as illustrated in FIG. 1A the hydraulic fluid is conducted from the first cylinder 2 through the switch valve 9 that is configured as a 3/2-way valve upstream of the check valve 15 of the second cylinder 3 as illustrated by the arrow 16 in FIG. 1A. The check valve 15 is opened by the flow of the hydraulic fluid. The hydraulic fluid flows from the cylinder 2 through the conduit 12, the drain 7, the switch valve 9, a supply conduit 17 of the hydraulic module 10, a connection conduit 18 between the supply conduit 17 and the second inlet 5, the second inlet 5 and the conduit 13 into the second cylinder 3. The differential volume of the two cylinder 2, 3 can thus drain through a conduit 19 as a throttle in the supply conduit 17 into the supply conduit 6 of the connecting rod 1 and further into a bearing shell of the connecting rod 1. Thus, a preloading to the second cylinder 3 (MKS-chamber) through the pressure of the first cylinder 2 (GKS-Chamber) is assured. The aperture 19 has the advantageous effect that pressure builds up upstream of the check valve 15 so that the second cylinder 3 can be filled reliably. The second cylinder 3 is so to speak preloaded.

When switching from $\varepsilon_{low}$ (S1) to $\varepsilon_{high}$ (S2) as illustrated in FIG. 1B the hydraulic fluid is conducted from the second cylinder 3 through another aperture 20 as a throttle in the drain 8 of the second cylinder 3 upstream of the check valve 14 of the first cylinder 2 illustrated by an arrow 21. The check valve 14 is opened by the flow of the hydraulic fluid. The hydraulic fluid volume from the difference of the chamber volumes is suction pulled through the supply conduit 6 from the bearing shell. Thus, the hydraulic fluid can flow through the aperture 19 configured as a throttle into the system (arrow 27).

The diameters of the apertures 19, 20 are selected so that the switching process from $\varepsilon_{low}$ to $\varepsilon_{high}$ is sufficiently slow to prevent damages to the connecting rod 1, wherein a sufficient preloading of the MKS-chamber 3 is simultaneously set for the switching process into the opposite direction.

The hydraulic concept according to the invention provides that the system is provided in a hydraulically preloaded condition in the switching position $\varepsilon_{low}$. This means that the hydraulic fluid from the larger GKS-chamber 2 is conducted directly into the MKS-chamber 3 wherein superfluous hydraulic fluid is drained through an aperture configured as a throttle into the bearing shell.

It is simultaneously provided for the switching process from $\varepsilon_{low}$ to $\varepsilon_{high}$ that the system is always supplied with a sufficient amount of hydraulic fluid so that the pressure does not drop too far since a pressure drop would immediately cause air to gas out of the hydraulic fluid which makes the system loose its hydraulic preload. This can cause an undesirable destabilization of the lever system. This means that the lever of the eccentrical element adjustment arrangement can cover a large amplitude during a revolution of the crank shaft wherein the large amplitude leads to almost un dampened impacts of pistons 22, 23 at a chamber base or at the oil column and eventually causes very large pressure spikes in the system. The pistons 22, 23 are connected with a lever 49 of the eccentrical element adjustment arrangement through eccentrical element rods 24, 25.

The system is overall connected so that a control by the hydraulic module 10 is possible, wherein the control includes all functional components including the switch valve 9 and check valves 14, 15. The hydraulic diagram illustrated in FIGS. 1A and 1B facilitates an engineering design of the hydraulic module 10 that is easily producible and fits into the limited installation space. In order to increase robustness the plumbing or boring requirements in the connecting rod base element are kept to a minimum.

FIGS. 2A and 2B illustrate a second embodiment of a hydraulic diagram of a connecting rod 1 with a hydraulic module 10 according to the invention in the first switching position $\varepsilon_{low}$ (S1) (FIG. 2A) and in the second switching position $\varepsilon_{high}$ (S2) (FIG. 2B).

An additional check valve 26 is provided parallel to the aperture 19 as a throttle in the supply conduit 17.

In the position $\varepsilon_{low}$ the GKS drain bore hole 7 is ideally connected un throttled with the supply conduit 6 within the switch valve 9. The high pressure level on the GKS side is used and moved upstream of the MKS-check valve 15. This pressure level is typically much greater than the pressure level from the supply conduit 6 and generates a basic pressure level in the MKS-chamber 3 which increases stiffness of the chamber 3 and thus position stability in the position $\varepsilon_{low}$. This effect is only provided when the GKS-chamber 2 is larger than the MKS-chamber 3. This means, however, that the differential volume has to be conducted into the bearing shell 3 of the connecting rod 1 since a complete adjustment is not possible otherwise. Draining is only possible through the throttle bore hole in the supply side check valve 26 and thus limits a volume flow, thus an adjustment speed from $\varepsilon_{high}$ to $E_{low}$.

For the switching process from $\varepsilon_{high}$ to $\varepsilon_{low}$ there is no difference to the first embodiment of the hydraulic diagram according to FIG. 1A.

In the opposite adjustment direction from $\varepsilon_{low}$ to $\varepsilon_{high}$ hydraulic fluid can be suctioned pulled into the system also through the additional check valve 26 which is indicated by the arrow 28. This prevents that the system draws air through the leakages or a vacuum is pulled in the GKS chamber 2. This condition is considered problematic since very large undesired adjustment angles can be created at the lever 49.

In the switching position $\varepsilon_{high}$ the MKS drain bore hole 8 is connected with the supply conduit 6. Draining hydraulic fluid from the MKS-chamber 3 can be absorbed again directly by the GKS-chamber 2 through the check valve 14. When the MKS-chamber volume is smaller than the GKS-chamber volume a differential volume is fed through the supply side check valve 26. The MKS drain is provided throttled so that the adjustment speed from $E_{low}$ to $\varepsilon_{high}$ is limited. In $\varepsilon_{high}$ the GKS-drain bore hole 7 is closed.

Hydraulic fluid coming from leakage at the shoulder piston 11 of the switch valve 9 can drain easily through bore holes 51 in the closure covers 50 in a direction towards the tank drain.

FIGS. 3-17 show a hydraulic module 10 in different views, sectional views and in the two switching positions S1 and S2 in which the second embodiment of the hydraulic diagram according to FIGS. 2A and 2B is implemented.

The hydraulic module 10 with a switch valve 9 for controlling a hydraulic fluid flow of a connecting rod 1 for an internal combustion engine with variable compression with an eccentrical adjustment arrangement includes a displaceable piston 11 of the switch valve 9 which is optionally displaceable into a first switching position S1 or a second switching position S2. Thus hydraulic fluid can be conducted in the first switching position S1 form the first cylinder 2 into the second cylinder 3 and in the second switching position S2 the hydraulic fluid is conductible from the second cylinder 3 into the first cylinder 2. The switch valve 9 is configured as a 3/2 way valve.

The two check valves 14, 15 and the aperture 20 are integrated into the switch valve 9. The check valves 14, 15 include an essentially annular band element 47, 48 as a closure element with a circumference which at least partially envelops the housing 30 of the switch valve 9 at its circumference and which is at least partially supported at the housing 30. The band element 47, 48 respectively closes openings 45, 40 of the housing 30 in a closed position. Thus, the check valves 14, 15 open in a radially outward direction.

FIGS. 4 and 7-11 show the first switching position S1 ($\varepsilon_{low}$) of the hydraulic module 10. The hydraulic module 10 includes a housing 30 with operating connections 31, 32 that are configured as circumferential ring grooves, wherein the conduit 13 of the second cylinder 3 is associated with the first operating connection 31 and the conduit 12 of the first cylinder 2 is associated with the second operating connection 32. The check valves 14 and 15 are configured as band-check valves and positioned in the annular grooves by rotation safeties 35, 36. The rotation safeties 35, 36 simultaneously form the drains 7, 8 of the cylinders 2, 3. The supply conduit 17 is also provided as a circumferential annular groove 33.

As evident from the drawing figures the inlets and outlets are combined so that only three connections 17, 31, 32 are provided. This means all three connections 17, 31, 32 are respectively used as an inlet as well as an outlet.

The piston 11 of the hydraulic module 10 is configured as a shoulder piston which is in the illustrated switching position S1 ($\varepsilon_{low}$) in its right end position in the drawing figure. The piston 11 is provided axially movable in a running bushing 34 that is arranged in the housing 30.

In particular from FIGS. 7-11 the hydraulic fluid flow can be derived which was already described with respect to FIGS. 1A and 1B as arrows or partial arrows 16.

Through the illustrated end position of the piston 11 hydraulic fluid can flow from the first cylinder 2 through the rotation safety 36 and an opening 37 of the running bushing 34 into an annular space 38 that envelops the piston 11. This annular space 38 is connected with an undercut 39 of the housing 30 which advantageously covers 286° of an inner circumference of the housing 30. The undercut 39 is connected through openings 40 in the housing 30 with the annular groove 33 and the hydraulic fluid opens the check valve 15.

Figure 18:
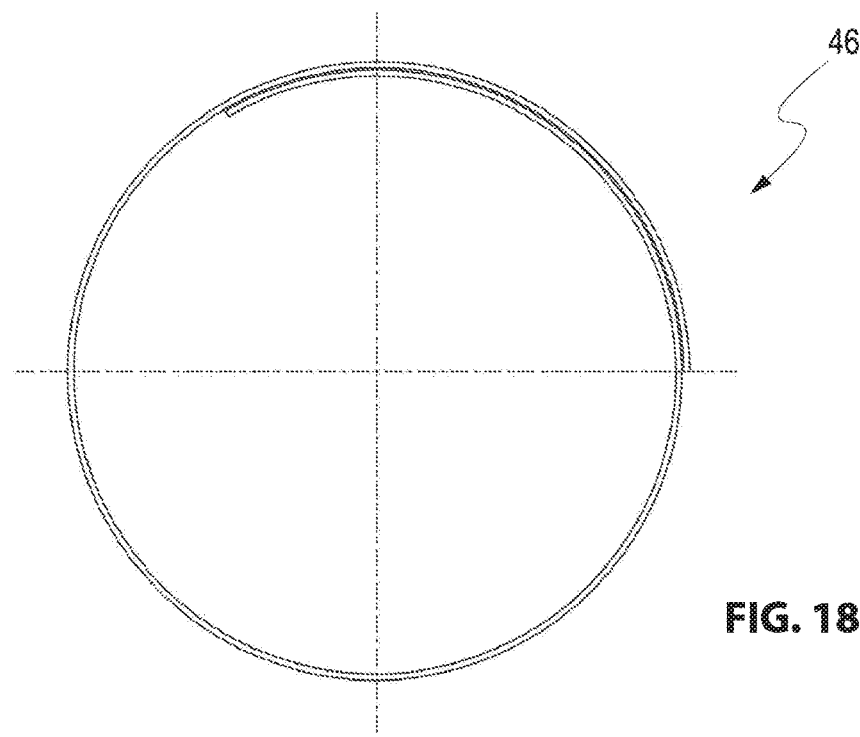
FIG. 18 illustrates a first view of a band element of a check valve of the hydraulic module according to FIG. 3.
Figure 19:
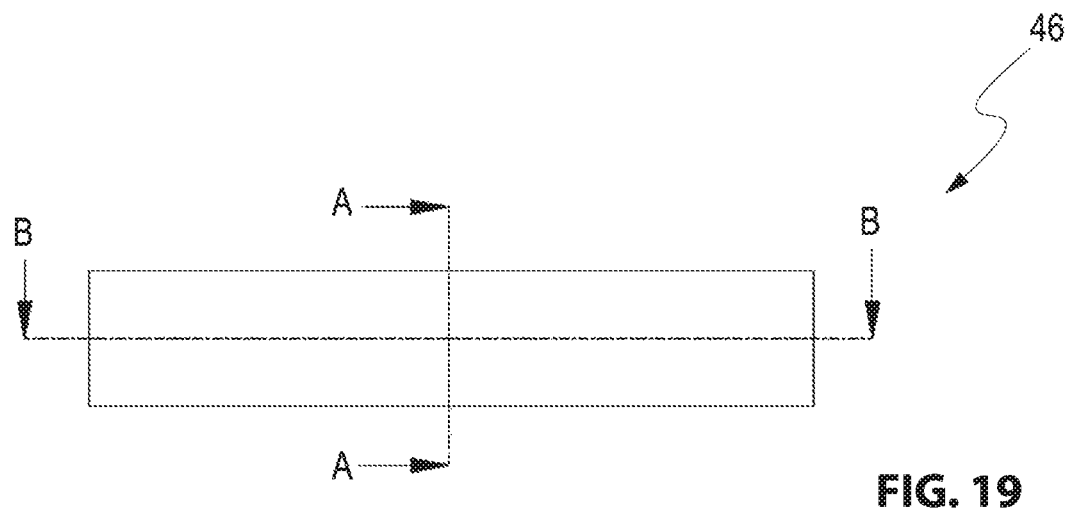
FIG. 19 illustrates a second view of the band element of the check valve according to FIG. 18.
Figure 20:
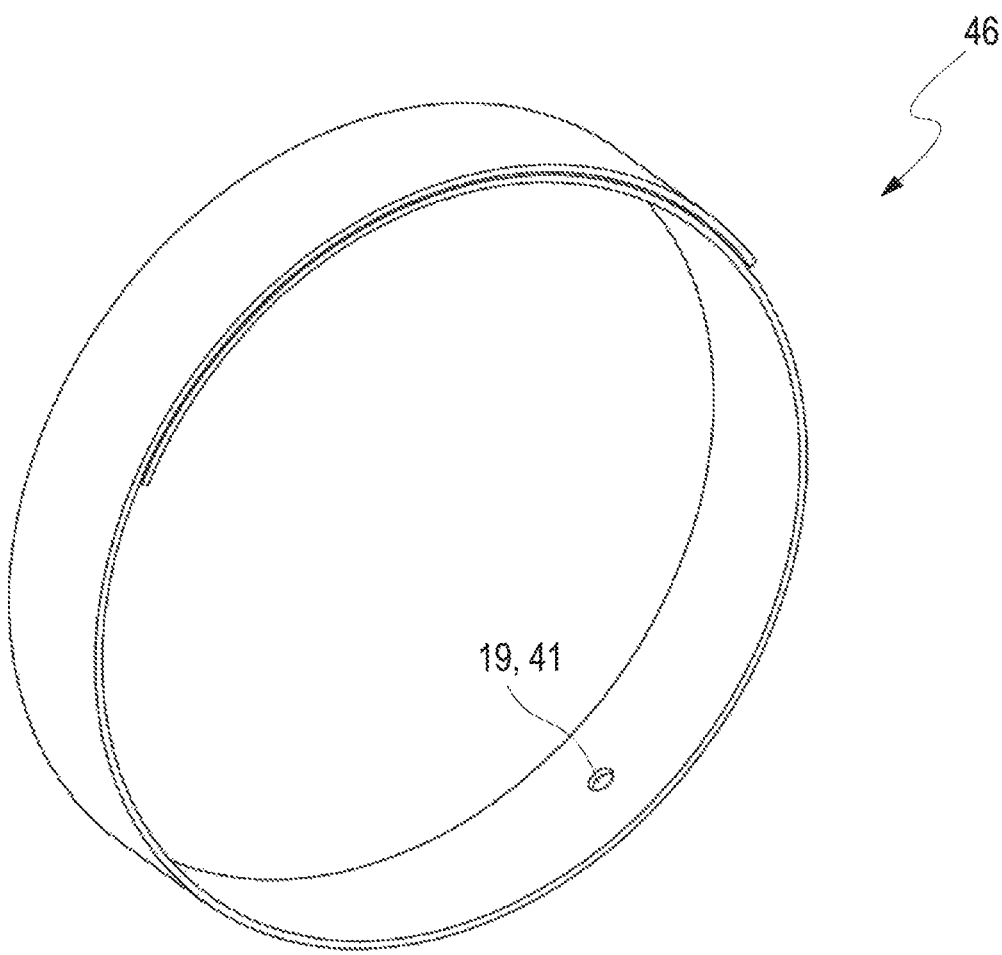
FIG. 20 illustrates a perspective of the band element of the check valve according to FIG. 18.

FIG. 11 illustrates the check valve 26 configured as a band-check valve, which is illustrated in FIGS. 18-20 with the band element 46 as an individual component and which contacts an undercut of the housing 30. The check valve 26 includes an essentially annular closure element as a band element 46 which is at least partially supported at the housing 30 of the switch valve 9 and which closes at least an opening 43 of the housing 30 in a closed position. Thus, the check valve 26 is arranged in an interior of the housing 30 of the switch valve 9 and opens in a radially inward direction.

The check valve 26 is combined in this embodiment with an aperture 19 that forms a throttle wherein the aperture 19 is formed by a bore hole 41 through which hydraulic fluid can flow in a throttled manner in the illustrated position through openings 43 of the housing 30 into the supply conduit 6 of the connecting rod 1 (arrow 42). The check valve 26 thus remains closed and prevents hydraulic fluid from draining.

In an alternative embodiment the check valve 26 can be configured as a ball check valve and can be arranged in the housing 30 of the switch valve 9 wherein the housing 30 can have a notch that is oriented parallel to the hydraulic fluid path of the check valve 26 and forms an aperture 19.

Figure 24:
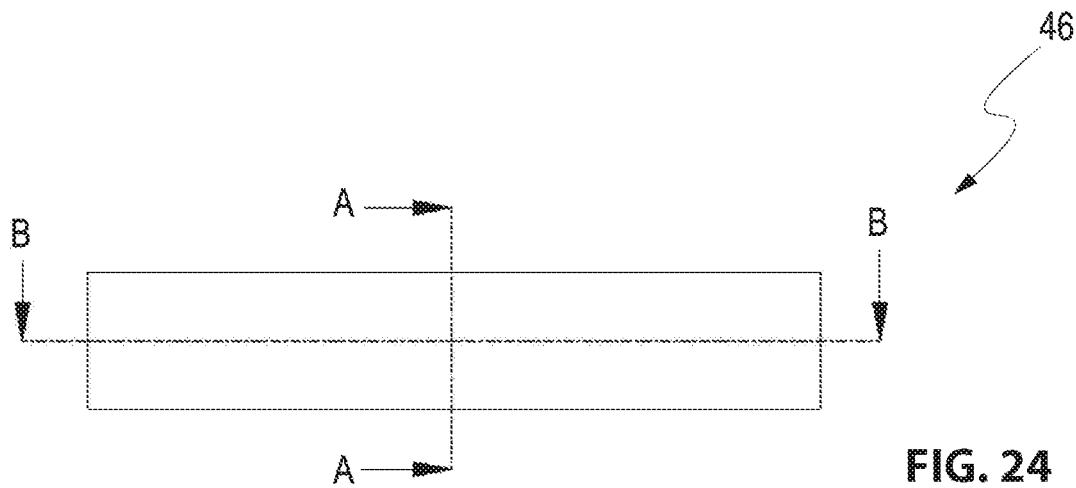
FIG. 24 illustrates a second view of the band element of the check valve according to FIG. 23.
Figure 25:
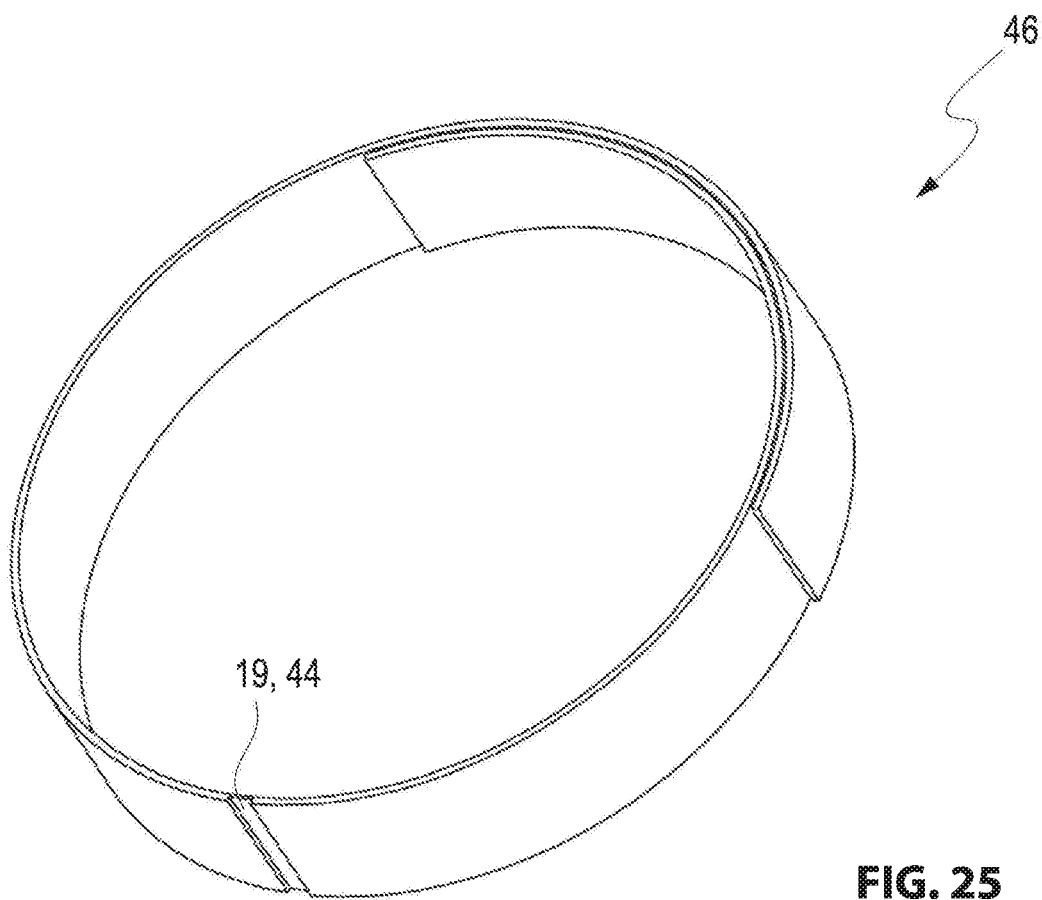
FIG. 25 illustrates a perspective view of the band element of the check valve according to FIG. 23.

FIGS. 23-25 illustrate another embodiment of the band element 46 for the check valve 26. As a difference from the first embodiment this check valve includes a notch 44 configured as a throttle 19.

In an alternative embodiment the housing 30 can include a notch oriented towards a circumference of the band element 46 as an aperture 19.

FIGS. 12-17 illustrate the second switching position S2 ($\varepsilon_{high}$) in which the piston 11 is in its left end position in the drawing figure. In this switching position hydraulic fluid is conducted from the second cylinder 3 into the first cylinder 2, which is represented by the arrow or the partial arrows 21. Simultaneously hydraulic fluid can be suction pulled through the check valve 26 (arrow 28) as evident in particular from FIG. 15.

The switch valve 9 functions analogous to the known bi-stable switch of DE 10 2013 107 127 A1, this means the piston 11 has two end position and thus respectively closes a conduit to the cylinders 2, 3. When the gallery pressure which is applied to a first pressure surface of the piston 11 in $\varepsilon_{high}$ exceeds a pre-determined value the piston 11 starts to move. After a predetermined travel path a second pressure surface is added and the piston 11 leaps into the end position $\varepsilon_{low}$. The pressure that is required to shift the piston 11 back is much lower than the pressure that is required to move the piston in $E_{low}$. Thus, a range is generated in which both piston positions are held in a stable manner (bi-stable range).

In both piston positions the outward opening check valves 14, 15 are connected in the GKS- and the MKS-ring channel 31, 32 with the supply conduit 17 which is facilitated by the 286° undercut of the housing 30. The band check valves 14, 15 are positioned secured against rotation by the position rings or rotation safeties 35, 36 and radially flow impacted by the bore holes or openings 40, 45. The position rings 35, 36 include a bore hole through which hydraulic fluid can flow from the cylinders 2, 3 back into the hydraulic module 10.

Through the 286° undercut the inlets 4, 5 and the outlets 7, 8 are geometrically separated from each other. The running bushing 34 is pressed into the housing 30.

The band elements 46 of the band-check valves 14, 15 are axially supported rather tightly since the hydraulic fluid can flow tangentially past an inner radius of the band check valves 14, 15 that are bent open by the pressure.

Behind the inlet of the supply conduit 6 a band check valve 26 with a bore hole 41 is arranged in the band element 46 wherein the band check valve is arranged so that it opens in inward direction. This lets hydraulic fluid flow from the oil gallery into the hydraulic module 10 but lets the hydraulic fluid flow out in a throttled manner only as a function of a size of the bore hole 41 from the hydraulic module 10.

The band check valve 26 is arranged in an undercut in the housing 30 and seals an annular smaller undercut. This undercut provides independently from an annular orientation of the band check valve 26, which is not secured against rotation, that the drain bore hole is always connected with the supply conduit 6 of the connecting rod 1. The band-check valve 26 is impacted by an asymmetrical flow so that the band-check valve 26 is pressed into a position. This has an advantage over a symmetrical flowing of the band-check valve 26 from all sides in that tumbling is prevented. The band check 26 has a rather large axial clearance in the undercut so that the hydraulic fluid can flow past the band check valve 26 laterally.

The connecting rod 1 according to the invention advantageously requires only three hydraulic fluid conduits in the connecting rod base element so that fabrication is simplified. Furthermore only a 3/2 way valve is required in the switch valve 9 in the hydraulic module 10 which simplifies the engineering design of the connecting rod 1 considerably. The MKS-hydraulic chamber 3 can be preloaded by the GKS-hydraulic chamber 2 in the first switching position S1 with low compression $\varepsilon_{low}$. Advantageously only differential volumes of hydraulic fluid between the GKS- and MKS-hydraulic chamber 2, 3 are exchanged with the bearing shell of the connecting rod 1. This means no additional hydraulic fluid flows through the hydraulic fluid conduits in the bearing shells. Check valves 14, 15 and throttles 19, 20 can be advantageously integrated into the engineering design of the hydraulic module 10. The hydraulic diagram for both variants without or with additional check valve 26 can be arranged in a hydraulic module 10.

What is claimed is:

1. A hydraulic module with a switch valve for controlling a flow of a hydraulic fluid in a connecting rod for an internal combustion engine with variable compression with an eccentrical element adjustment arrangement for adjusting an effective connecting rod length,
   wherein the eccentrical element adjustment arrangement includes a first cylinder and a second cylinder configured as hydraulic chambers,
   wherein a first inlet is provided for feeding the hydraulic fluid into the first cylinder and a second inlet is provided for feeding the hydraulic fluid into the second cylinder,
   wherein a first outlet is provided for draining the hydraulic fluid from the first cylinders and a second outlet is provided for draining the hydraulic fluid form the second cylinder,
   wherein a first check valve is associated with the first cylinder and a second check valve is associated with the second cylinder,
   wherein the first check valve is arranged in the first inlet and facilitates feeding the hydraulic fluid into the first cylinder and prevents draining the hydraulic fluid from the first cylinder,
   wherein the second check valve is arranged in the second inlet and facilitates feeding the hydraulic fluid into the second cylinder and prevents draining the hydraulic fluid from the second cylinder,
   wherein the switch valve includes a piston which is displaceable into a first switching position or a second switching position, and
   wherein the first cylinder and the second cylinder are connected so that hydraulic fluid is conductible in the first switching position from the first cylinder into the second cylinder, and
   wherein a supply conduit from the switch valve into a bearing shell of the connecting rod includes a second aperture configured as a second throttle through which the hydraulic fluid can drain in a throttled manner and is suction feedable in a throttled manner in the first switching position.

2. The hydraulic module according to claim 1, wherein the hydraulic fluid is conductible in the second switching position from the second cylinder into the first cylinder.

3. The hydraulic module according to claim 1, wherein the outlet of the second cylinder includes at least one first aperture configured as a throttle.

4. The hydraulic module according to claim 1, wherein at least one of the first check valves or the second check valve or the at least one first aperture is integrated into the switch valve.

5. The hydraulic module according to claim 4,
wherein at least one of the first check valve and the second check valve includes an essentially annular band element with a circumference and configured as a closure element,
wherein the essentially annular band element envelops the housing of the switch valve at least partially with the circumference and is at (east partially supported at the housing and closes at least one opening of the housing in a closed position of the check valve.

6. The hydraulic module according to claim 5, wherein the at least one first check valve and the at least one second check valve opens in a radially outward direction.

7. The hydraulic module according to claim 1, wherein the switch valve is configured as a 3/2 way valve.

8. The hydraulic module according to claim 1,
wherein the first inlet and the first outlet of the first cylinder is configured as a conduit in the switch valve, or
wherein the second inlet and the second outlet of the second cylinder is configured as a conduit in the switch valve.

9. A connecting rod for an internal combustion engine with variable compression with an eccentrical element adjustment device for adjusting an effective connecting rod length with a hydraulic module according to claim 1.

10. A hydraulic module with a switch valve for controlling a flow of a hydraulic fluid in a connecting rod for an internal combustion engine with variable compression with an eccentrical element adjustment arrangement for adjusting an effective connecting rod length,
wherein the eccentrical element adjustment arrangement includes a first cylinder and a second cylinder configured as hydraulic chambers,
wherein a first inlet is provided for feeding the hydraulic fluid into the first cylinder and a second inlet is provided for feeding the hydraulic fluid into the second cylinder,
wherein a first outlet is provided for draining the hydraulic fluid from the first cylinders and a second outlet is provided for draining the hydraulic fluid form the second cylinder,
wherein a first check valve is associated with the first cylinder and a second check valve is associated with the second cylinder,
wherein the first check valve is arranged in the first inlet and facilitates feeding the hydraulic fluid into the first cylinder and prevents draining the hydraulic fluid from the first cylinder,
wherein the second check valve is arranged in the second inlet and facilitates feeding the hydraulic fluid into the second cylinder and prevents draining the hydraulic fluid from the second cylinder,
wherein the switch valve includes a piston which is displaceable into a first switching position or a second switching position, and
wherein the first cylinder and the second cylinder are connected so that hydraulic fluid is conductible in the first switching position from the first cylinder into the second cylinder,
wherein a supply conduit of the switch valve includes a second aperture configured as a second throttle through which the hydraulic fluid can drain in a throttled manner and is suction feedable in a throttled manner in the first switching position and
wherein a third check valve is provided in the supply conduit parallel to the second aperture wherein the third check valve facilitates feeding hydraulic fluid into the switch valve and prevents an outflow of the hydraulic fluid.

11. The hydraulic module according to claim 10, wherein the third check valve includes an essentially annular band element configured as a closure element which is at least partially supported at a housing of the switch valve and which closes at least one first opening of the housing in a closed position of the check valve.

12. The hydraulic module according to claim 11, wherein the check valve is arranged in an interior of the housing of the switch valve and opens in a radially inward direction.

13. The hydraulic module according to claim 11, wherein the essentially annular band element includes a radial bore hole that is configured as the second aperture and arranged on a circumference of the essentially annular band element.

14. The hydraulic module according to claim 11, wherein the essentially annular band element (46) includes a notch that is oriented towards a circumference of the essentially annular band element (46) and configured as the second aperture (19).

15. The hydraulic module according to claim 11, wherein the housing includes a notch oriented towards a circumference of the band element and configured as the second aperture.

16. The hydraulic module according to claim 10, wherein the aperture and the third check valve are provided as a combined element.

17. The hydraulic module according to claim 10, wherein the third check valve is configured as a ball check valve and arranged in the housing of the switch valve and the housing includes a notch that extends parallel to a hydraulic fluid path of the check valve and that is configured as the second aperture.

* * * * *